United States Patent
Kitamura

(10) Patent No.: US 7,886,299 B2
(45) Date of Patent: *Feb. 8, 2011

(54) METHOD OF DYNAMICALLY BALANCING WORKLOAD OF A STORAGE SYSTEM

(75) Inventor: Manabu Kitamura, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 1509 days.

This patent is subject to a terminal disclaimer.

(21) Appl. No.: 11/058,130

(22) Filed: Feb. 14, 2005

(65) Prior Publication Data

US 2005/0267929 A1    Dec. 1, 2005

Related U.S. Application Data

(63) Continuation-in-part of application No. 10/858,717, filed on Jun. 1, 2004, now Pat. No. 7,209,967.

(51) Int. Cl.
G06F 9/46 (2006.01)
G06F 15/173 (2006.01)

(52) U.S. Cl. ............. 718/104; 718/105; 709/224; 709/225; 709/226

(58) Field of Classification Search ............. 711/114; 709/223–226; 718/104–105, 102
See application file for complete search history.

(56) References Cited

U.S. PATENT DOCUMENTS

| | | | |
|---|---|---|---|
| 6,052,733 A * | 4/2000 | Mahalingam et al. ....... 709/235 |
| 6,173,306 B1 * | 1/2001 | Raz et al. ................... 718/102 |
| 6,237,063 B1 | 5/2001 | Bachmat et al. |
| 6,330,687 B1 * | 12/2001 | Griffith ........................ 714/6 |
| 6,389,448 B1 * | 5/2002 | Primak et al. ............... 718/105 |
| 6,490,632 B1 * | 12/2002 | Vepa et al. .................. 709/250 |
| 6,567,811 B1 * | 5/2003 | Edwards et al. ............. 707/100 |
| 6,701,377 B2 * | 3/2004 | Burmann et al. ............ 709/249 |
| 6,708,252 B2 | 3/2004 | Yamamoto et al. |
| 6,711,559 B1 | 3/2004 | Kogota et al. |
| 2002/0161855 A1 | 10/2002 | Manczak et al. |
| 2003/0110237 A1 | 6/2003 | Kitamura et al. |
| 2005/0038890 A1 | 2/2005 | Masuda et al. |

OTHER PUBLICATIONS

"EMC Celerra CNS Series Network Attached Storage," product data sheet EMC Corporation Hopkinton, MA (2003, 2004).

* cited by examiner

*Primary Examiner*—Qing Wu
*Assistant Examiner*—Camquy Truong
(74) *Attorney, Agent, or Firm*—Mattingly & Malur, P.C.

(57) ABSTRACT

A storage system comprises a plurality of processors, a plurality of volumes, and interconnecting means to connect the plurality of processors and the plurality of volume to each other. The storage system detects and determines the cause of the performance bottleneck, wherein the cause may be one of plurality of reasons. The storage system applies an appropriate load balancing method according to the determined cause of the performance bottleneck.

18 Claims, 19 Drawing Sheets

Fig. 4

| IP Address | DEVICE | FILESYSTEM | LOAD |
|---|---|---|---|
| 192.168.1.11 | 521 | A1 | 400 |
| 192.168.1.12 | 522 | A2 | 200 |
| 192.168.1.13 | 522 | A4 | 150 |
| 192.168.1.14 | 523 | A3 | 350 |

| NODE | LOAD |
|---|---|
| 1 | 1100 |
| 2 | 500 |
| 3 | 800 |

| THRESHOLD |
|---|
| 400 |

601 602 603
600

Fig. 9
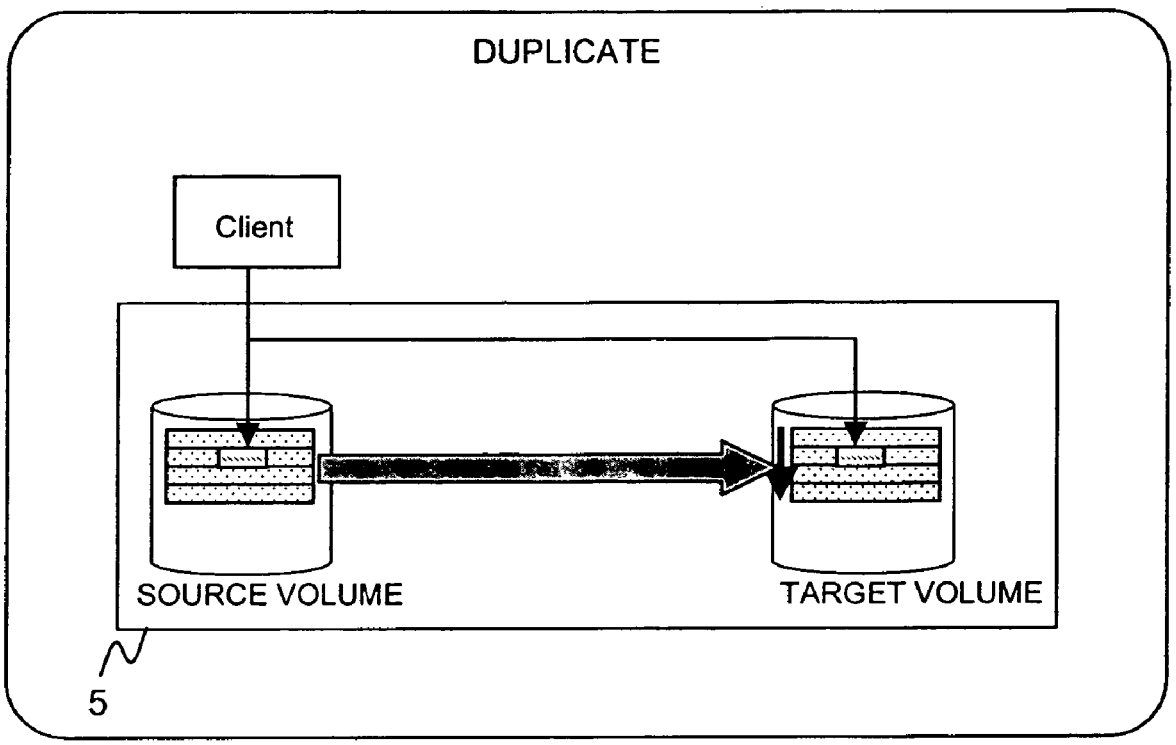
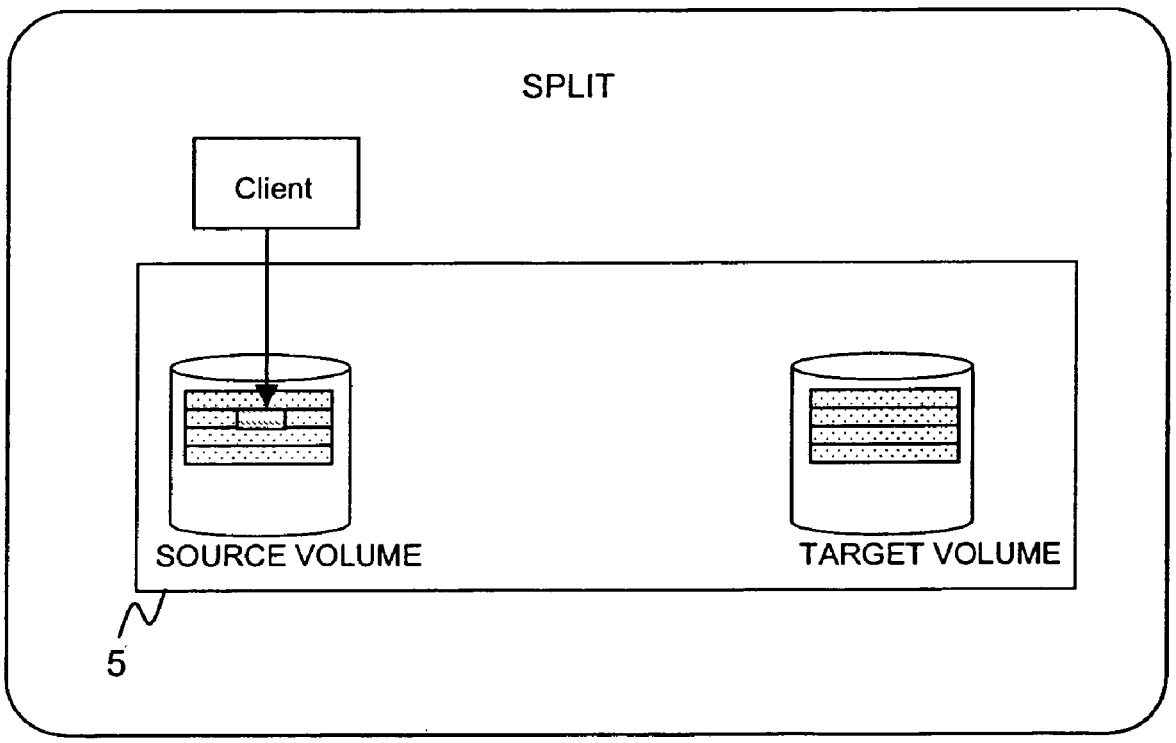

FIG. 17

| RAID Gr. # | DEVICE | NODE | FILESYSTEM | IP Address | LOAD |
|---|---|---|---|---|---|
| 0 | 521 | 1 | A1 | 192.168.1.11 | 400 |
| 0 | 522 | 1 | A2 | 192.168.1.12 | 400 |
| 0 | 522 | 1 | A4 | 10.13.1.1 | 150 |
| 0 | 523 | NULL | NULL | NULL | 0 |
| 1 | 531 | 1 | A3 | 10.13.1.2 | 500 |
| 1 | 532 | 2 | A5 | 192.168.1.13 | 100 |
| 1 | 533 | 2 | A6 | 10.13.1.3 | 20 |
| 1 | 534 | NULL | NULL | NULL | 0 |

FIG. 19

|  | MAX. LOAD |
|---|---|
| LAN | 5000 |
| PROC. | 8000 |
| DISK | 1000 |

FIG. 18

| LAN | LOAD |
|---|---|
| 11-1 | 800 |
| 11-2 | 700 |

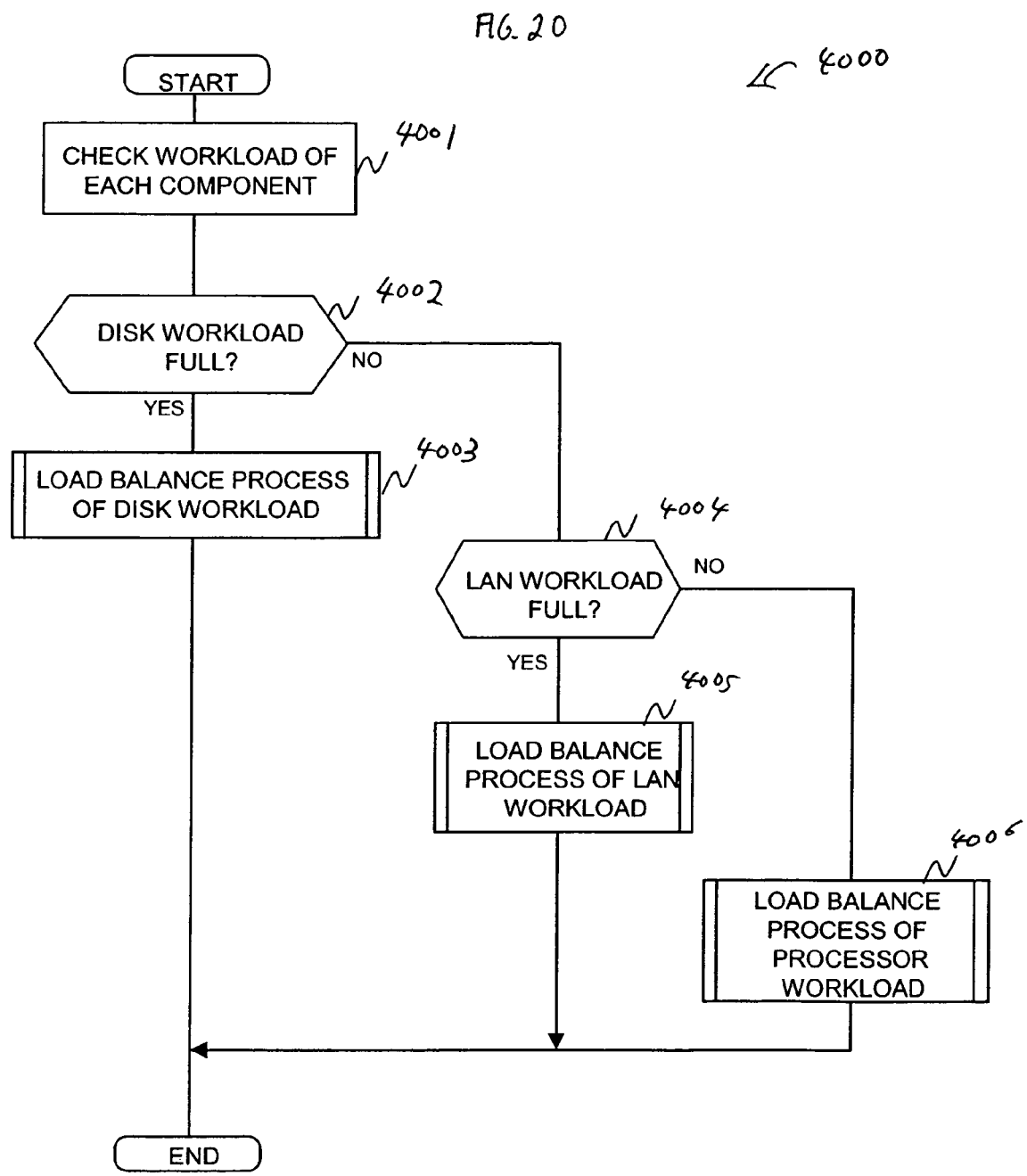

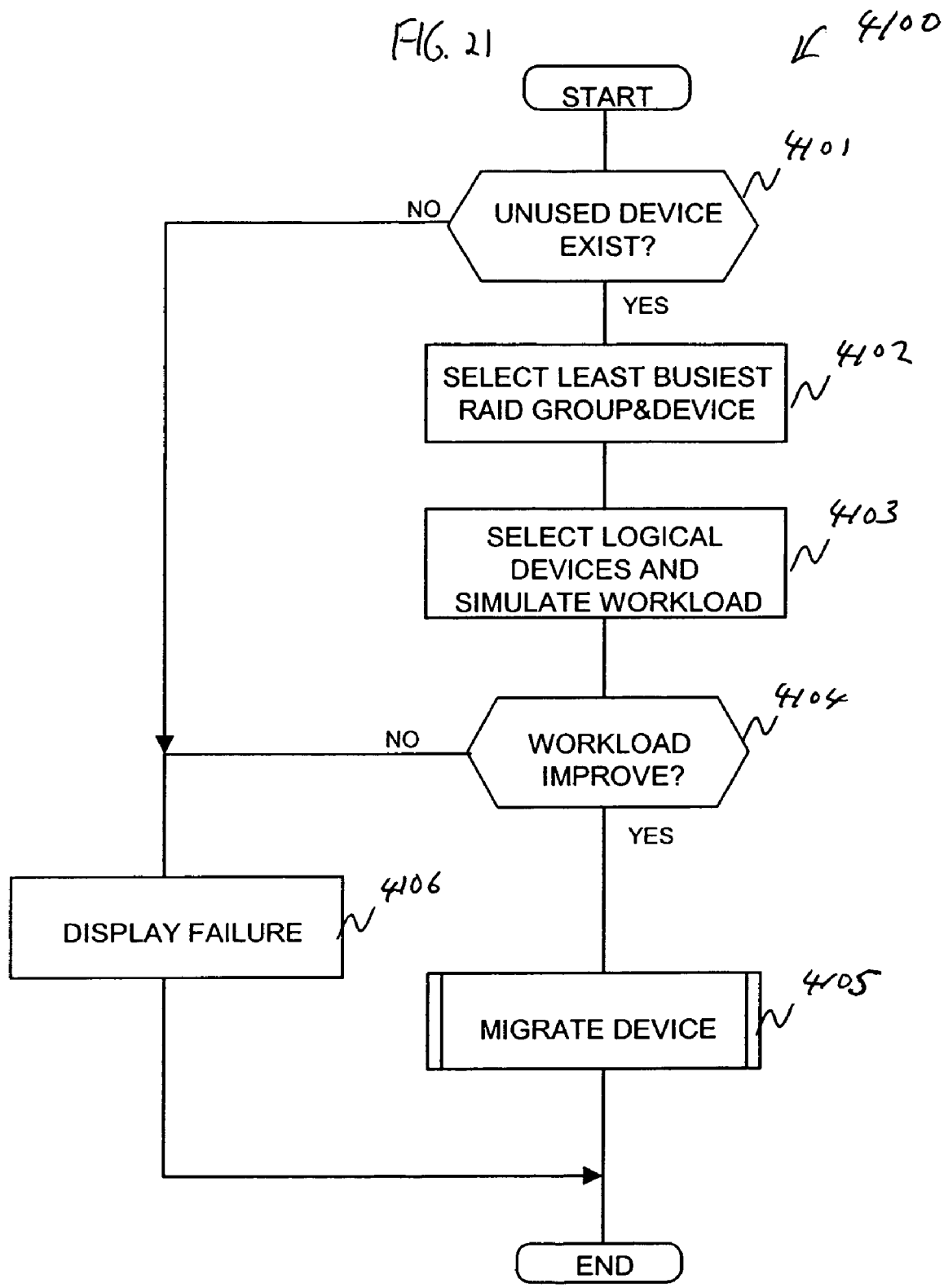

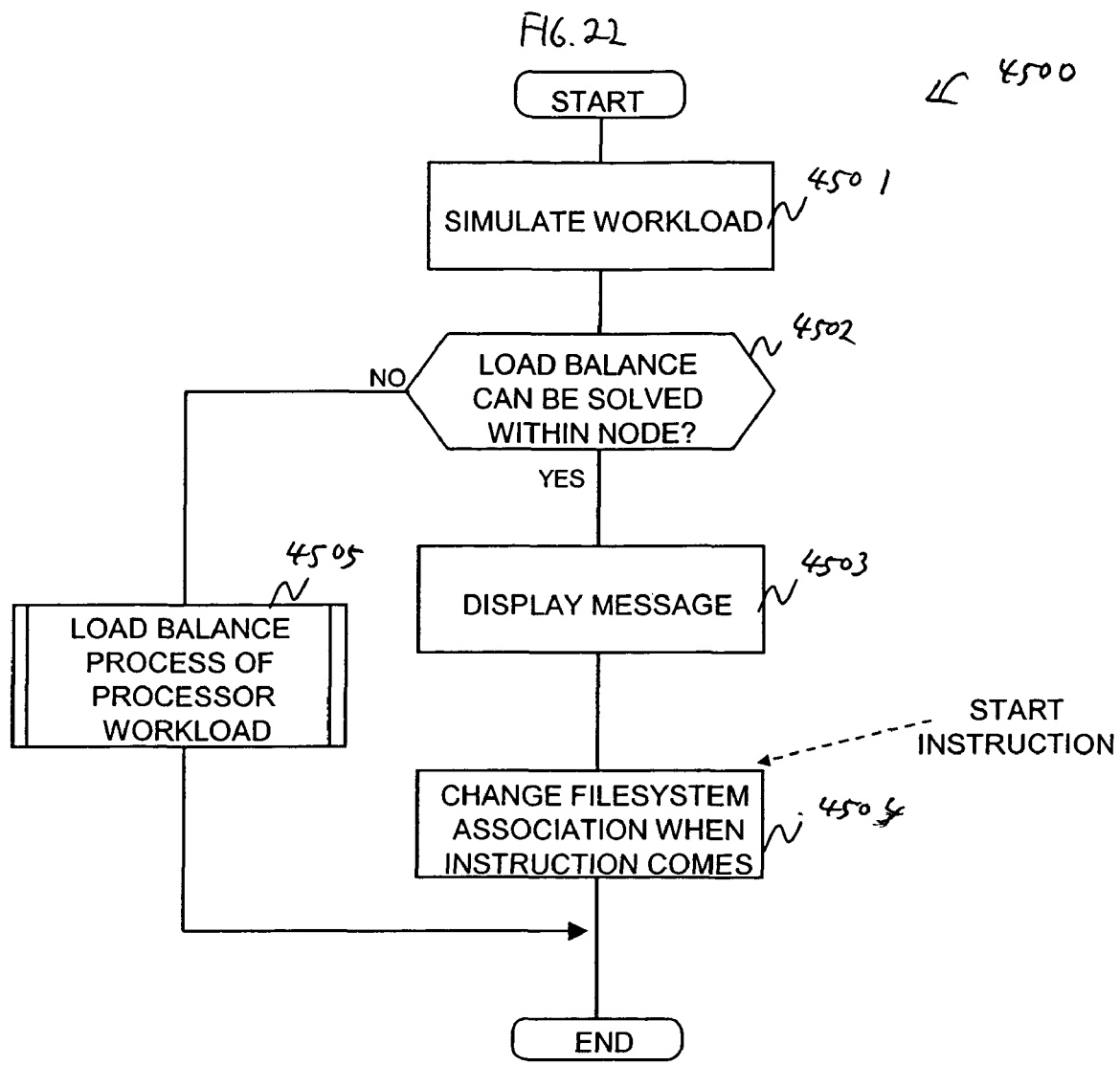

METHOD OF DYNAMICALLY BALANCING WORKLOAD OF A STORAGE SYSTEM

CROSS-REFERENCE TO RELATED APPLICATION

The present invention is a continuation-in-part application of U.S. patent application Ser. No. 10/858,717, now U.S. Pat. No. 7,209,967, filed on Jun. 1, 2004, which is incorporated by reference.

BACKGROUND OF THE INVENTION

The present invention relates to a storage system, more specifically, dynamic load balancing in a storage system having a plurality of host interfaces and processors.

Data is the underlying resources on which all computing processes are based. With the recent explosive growth of the Internet and e-business, the demand on data storage systems has increased tremendously. Generally, storage networking encompasses two applications or configurations: network-attached storage (NAS) or storage area network (SAN). A NAS uses IP over Ethernet to transports data in file formats between storage servers and their clients. In NAS, an integrated storage system, such as a disk array or tape device, connects directly to a messaging network through a local area network (LAN) interface, such as Ethernet, using messaging communications protocols like TCP/IP. The storage system functions as a server in a client-server system.

Generally, a SAN is a dedicated high performance network to move data between heterogeneous servers and storage resources. Unlike NAS, a separate dedicated network is provided to avoid any traffic conflicts between client and servers on the traditional messaging network. A SAN permits establishment of direct connections between storage resources and processors or servers. A SAN can be shared between servers or dedicated to a particular server. It can be concentrated in a single locality or extended over geographical distances. SAN interfaces can be various different protocols, such as Fibre Channel (FC), Enterprise Systems Connection (ESCON), Small Computer Systems Interface (SCSI), Serial Storage Architecture (SSA), High Performance Parallel Interface (HIPPI), or other protocols as they emerge in the future. For example, the Internet Engineering Task Force (IETF) is developing a new protocol or standard iSCSI that would enable block storage over TCP/IP, while some companies are working to offload the iSCSI-TCP/IP protocol stack from the host processor to make iSCSI a dominant standard for SANs.

Regardless of the types of storage system used, storage systems are increasingly required to store larger capacity and provide higher performance. To satisfy these requirements, the storage controllers for the enterprise or midrange storage systems have been provided with a plurality of processors. For example, Hitachi Lightning 9900™ comprises a plurality of Client-Host Interface Processors (CHIPs) to process multiple concurrent input and output request ("I/Os").

One issue of a NAS system is that the load balancing among multiple processors may be difficult. Sharing a volume or file system among multiple NAS processors (the processors that processes NFS/CIFS requests) may be difficult since a NAS processor caches the accessed data in their memory. This tends to make it difficult to maintain coherency or consistency for the cached data since there are multiple processors. Therefore, a file access request is generally processed one NAS processor at a time, not fully utilizing the multiple processors. Accordingly, among other features, it would be desirable to provide a good load balancing among multiple processors.

BRIEF SUMMARY OF THE INVENTION

The present invention relates to load balancing of a storage system or subsystem, e.g., in a network attached storage system (or NAS system) having a plurality of processors for processing access requests.

In one embodiment, a storage system includes a plurality of processors to process to access requests, a plurality of volumes to store data, and interconnecting means to connect the plurality of processors and the plurality of volumes each other. Each volume is assigned to one of the processors. The processor mounts the file systems in the volume, and an IP address is associated with each file system. When the load of one of the processors becomes heavier than other processors, one or more volumes (or file systems) that were assigned to the processor that is experiencing the heavier load is unmounted. The IP address corresponding to the unmounted volume is disabled from the processor. The volume and the IP address are reassigned to another processor whose load is lighter.

In one embodiment, a storage system coupled to a plurality of clients via a communication link includes a first file server including a first switching module and a first resource manager, the first resource manager configured to maintain a first resource table that provides mapping information; a second file server including a second switching module and a second resource manager, the second resource manager configured to maintain a second resource table that provides mapping information; a storage unit including a storage area of first type that is assigned to the first file server and a storage area of second type that is assigned to the second file server, the storage area of first type including a plurality of file systems, each file system being associated with an Internet Protocol (IP) address. The storage area of first type includes first, second, and third file systems are associated with first, second, and third IP addresses, respectively. The first resource table includes first load information, second load information, and third load information that indicates workloads of the first, second, and third file systems, respectively. The first switching module is configured to detach the first file system, so that the first file system could not be accessed by the first file server if it is determined that a workload of the first filer server is heavy.

In another embodiment, a method for performing load balancing of a storage system is disclosed. The system includes a console, first, second, and third file servers and a storage unit having a plurality of logical volumes. The method comprises accessing a workload table maintained by a system manger of the console, the console being coupled to the storage system via a communication link, the workload table providing workloads of the first, second, and third file servers in the storage system; determining a workload difference between a file server with the heaviest workload and a file server with the lightest workload according to the workload table, the file server with the heaviest workload being the first file server and the file server with the lightest workload being the second file server; and selecting a first file system associated with the first file server to be detached from the first file server if the workload difference exceeds a given value, the first file system being associated with an Internet Protocol (IP) address; determining whether or not a given logical volume wherein the first file system to be detached includes another file system. The method further includes if the given logical volume does not include another file system, stop exporting of the first file system to a client that is coupled to the storage system, and unmounting the first file system. On the other hand, if the given logical volume includes another file system, providing a copy of the first file system to a backup logical volume, stop exporting the first file system to the client, and unmounting the first file system.

In the method, the first file system is selected to be detached from the first file server if the system manager determines that moving the first file system from the first file server to the second file server would equalize workloads of the first and second file server more than moving any other file system that is associated with the first file server.

In another embodiment, a storage system includes a computer program and first, second, and third file servers. The storage system further includes a console and a storage unit having a plurality of logical volumes. The computer program comprises code for accessing a workload table maintained by a system manger of the console, the console being coupled to the storage unit and first, second, and third file servers via a network, the workload table providing workloads of the first, second, and third file servers in the storage system; code for determining a workload difference between a file server with the heaviest workload and a file server with the lightest workload according to the workload table, the file server with the heaviest workload being the first file server and the file server with the lightest workload being the second file server; code for selecting a first file system associated with the first file server to be detached from the first file server if the workload difference exceeds a given value, the first file system being associated with an Internet Protocol (IP) address; code for determining whether or not a given logical volume wherein the first file system to be detached includes another file system. The program also includes code for stop exporting of the first file system to a client that is coupled to the storage system, and code for unmounting the first file system, if the given logical volume does not include another file system. The program further includes code for providing a copy of the first file system to a backup logical volume, code for stop exporting the first file system to the client, and code for unmounting the first file system, if the given logical volume includes another file system.

In another embodiment, a storage system comprises a plurality of processors, a plurality of volumes, and interconnecting means to connect the plurality of processors and the plurality of volume to each other. The storage system detects the performance bottleneck within it and applies an appropriate load balancing method according to the cause of the performance bottleneck.

In another embodiment, a storage system coupled to a plurality of clients via a communication link includes a first file server including a first network interface and a second network interface, said first network interface being assigned a first group of Internet Protocol (IP) addresses and said second network interface being assigned a second group of IP addresses; a second file server including a third network interface assigned a third group of IP addresses; a storage unit including a storage area of first type that is assigned to the first network interface, a storage area of second type that is assigned to the second network interface, the storage area of first type including a first group of file systems, the storage area of second type including a second group of file systems, each file system being associated with an IP address; and a computer readable medium comprising a program to balance a workload. The program comprises code for determining whether or not a disk workload of a first group of disks is heavy; code for balancing the disk workload if the disk workload is determined to be heavy; and code for balancing a processor workload of a processor of the first file server if the processor workload is determined to be heavy.

In another embodiment, a storage system coupled to a plurality of clients via a communication link includes a first file server including a first network interface and a second network interface, said first network interface being assigned a first group of Internet Protocol (IP) addresses and said second network interface being assigned a second group of IP addresses; a second file server including a third network interface assigned a third group of IP addresses; a storage unit including a storage area of first type that is assigned to the first network interface, a storage area of second type that is assigned to the second network interface, the storage area of first type including a first group of file systems, the storage area of second type including a second group of file systems, each file system being associated with an IP address, wherein the storage area of first type includes first and second file systems which are associated with first and second IP addresses, respectively, and the storage area of second type includes third and fourth file systems; and a computer readable medium system comprising a program to balance a workload. The program comprises code for determining whether or not a disk workload of a first group of disks is heavy; code for balancing the disk workload if the disk workload is determined to be heavy; code for determining whether or not a workload of a first network interface is heavy; and code for reassigning the first file system from the storage area of first type to the storage area of second type if the workload of the first network interface is determined to be heavy.

In another embodiment, a method for balancing workload of a storage system including first and second file servers and a storage unit is disclosed. The file servers include a first file server including a first network interface and a second network interface, said first network interface being assigned a first group of Internet. Protocol (IP) addresses and said second network interface being assigned a second group of IP addresses, wherein the second file server includes a third network interface assigned a third group of IP addresses. The storage unit includes a storage area of first type that is assigned to the first network interface, a storage area of second type that is assigned to the second network interface, the storage area of first type including a first group of file systems, the storage area of second type including a second group of file systems, each file system being associated with an IP address. The method comprises determining whether or not the storage system is experiencing a performance degradation; determining a cause of the performance degradation, wherein the determined cause can be a first cause, a second cause, or a third cause; and applying an appropriate load balancing method according to the determined cause of the performance degradation, wherein the appropriate load balancing method is a first balancing method if the determined cause is the first cause, a second balancing method of the determined cause is the second cause, and a third balancing method if the determined cause is the third cause. The determining steps are performed within one of the file servers or a management device coupled to the file servers, the management device being provided external to the file servers. The management device is a console in one implementation.

In yet another embodiment, a computer readable medium including a computer program for balancing a workload of a storage system is disclosed. The computer program comprises code determining whether or not the storage system is experiencing a workload bottleneck; code for determining a cause of the workload bottleneck, wherein the determined cause can be a first cause, a second cause, or a third cause; and applying an appropriate load balancing method according to the determined cause of the workload bottleneck, wherein the appropriate load balancing method is a first balancing method if the determined cause is the first cause, a second balancing method of the determined cause is the second cause, and a third balancing method if the determined cause is the third cause.

BRIEF DESCRIPTION OF THE DRAWINGS

FIG. 4 shows a volume mapping table according to one embodiment of the present invention.

FIG. 5 illustrates a workload table maintained by a system manager according to one embodiment of the present invention.

FIG. 9 illustrates a mirroring operation according to one embodiment of the present invention.

FIG. 17 illustrates a resource management table 3400 that the system manager 61 maintains according to one embodiment of the present invention.

FIG. 18 shows a LAN workload table 3700 that each resource manager 104, 204, or 304 maintains according to one embodiment of the present invention.

FIG. 19 illustrates a workload table 3600 that maintains predefined threshold workloads for various components in the file system 3000 according to one embodiment of the present invention.

FIG. 20 illustrates a process 4000 for performing workload balancing according to one embodiment of the present invention.

FIG. 21 shows a process 4100 for disk workload balancing according to one embodiment of the present invention.

FIG. 22 illustrates a process 4500 for LAN workload balancing according to one embodiment of the present invention.

DETAILED DESCRIPTION OF THE INVENTION

Figure 1:
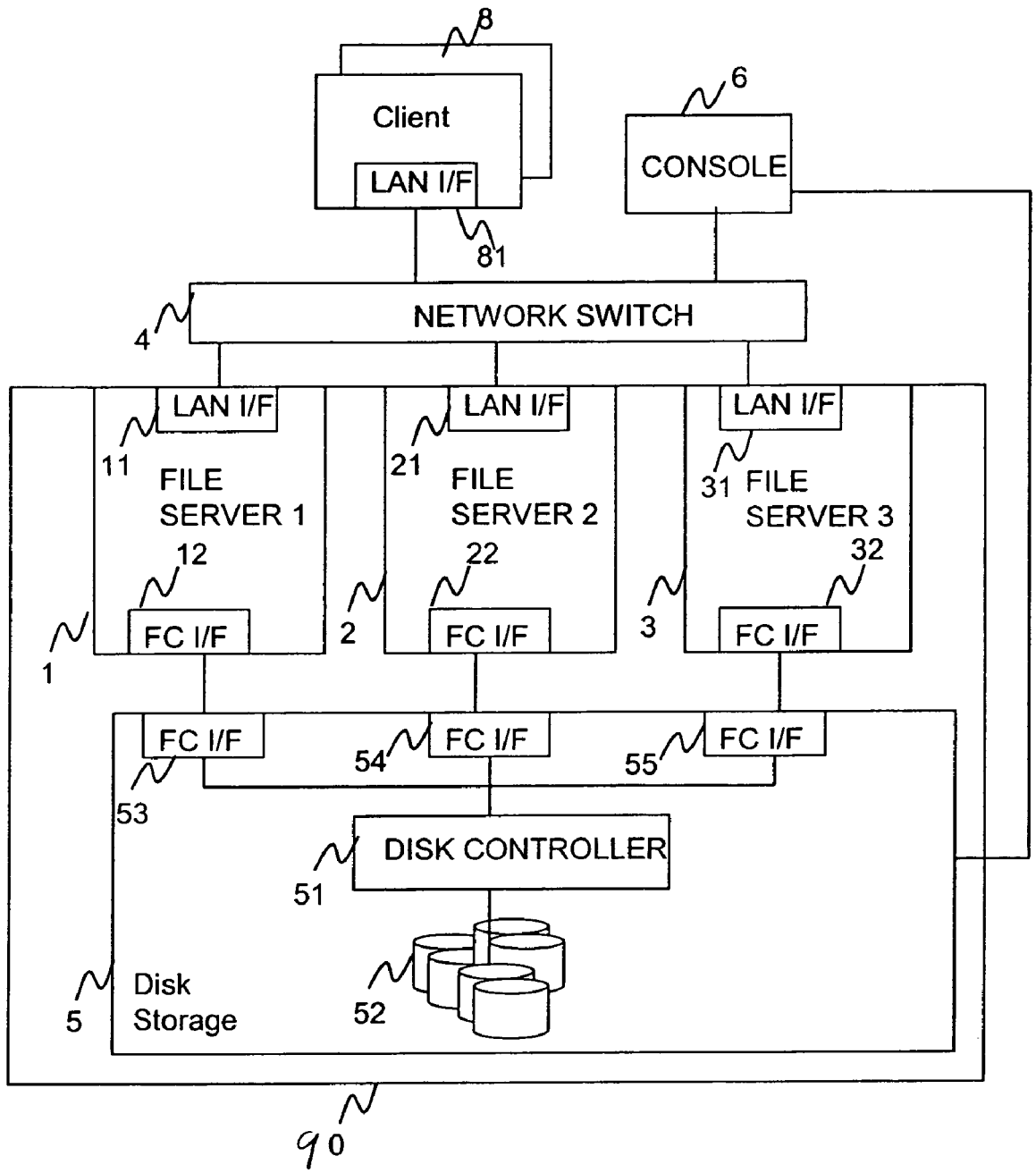
FIG. 1 illustrates a storage system according to one embodiment of the present invention.

FIG. 1 illustrates a storage system 90 according to one embodiment of the present invention. The storage system is a file server system in the present embodiment. File server system 90 is composed of a plurality of file servers 1, 2, and 3, and a disk storage 5. The file server may be a processor, e.g., a NAS processor, or module that is provided within the same housing as the disk storage. For example, the file server system is a disk array unit or subsystem including the file servers and disk storage. Alternatively, the file servers may be computer systems that are provided remotely from the disk storage.

One or more clients 8 are coupled to the storage system via a network 4. Each client includes a local area network (LAN) interface 81 that is coupled to the network. The clients or hosts send requests and commands to the storage subsystem. A console 6 is used to manage the storage system. In one embodiment, the console remotely located and is coupled to storage system 90 via the network 4. In another embodiment, the console may be integrated to the storage system or provided in a close proximity of the storage subsystem, in which case the console communicates with the storage system via a dedicated cable. The console may also communicate with the storage system via a wireless network.

In the present embodiment, file servers 1, 2, and 3 include local area network (LAN) interfaces 11, 21, and 31, respectively, for receiving file access requests from clients 8. The file servers 1, 2, and 3 also include Fibre Channel interfaces (FC I/F) 12, 22, and 32, respectively, to access disk storage 5. Each file server also includes a central processing unit (CPU) and a memory (not shown), as well as the programs for handling the file access requests.

Disk storage 5 includes a disk controller 51, a plurality of disks 52, and a plurality of Fibre Channel interfaces (FC I/F) 53, 54, and 55. The disk storage is coupled to the file servers via FC I/F 53, 54, and 55. As explained above, in one embodiment, the storage system 90 is a storage subsystem or disk array unit having a plurality of disk drives, where the file servers are provided within the same housing of the subsystem or disk array unit. In another embodiment, the storage system 90 comprises a plurality of remotely located device (e.g., a distributed system), where the disk storage is the storage subsystem or disk array unit, and the file servers are hosts coupled to the disk storage via a network.

Figure 2:
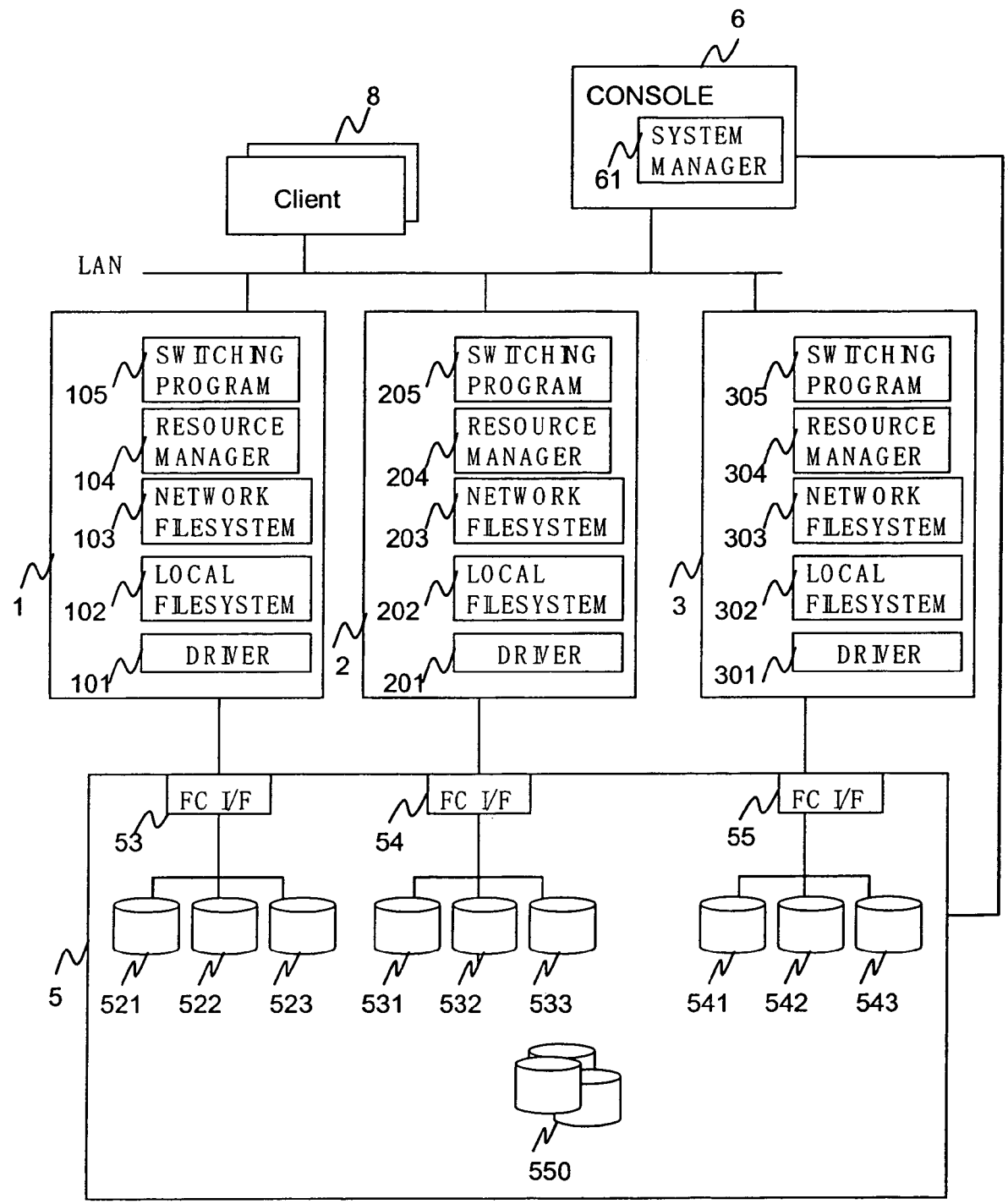
FIG. 2 illustrates a functional diagram of the file server system of FIG. 1 according to one embodiment of the present invention.

FIG. 2 illustrates a functional diagram of the file server system 90 according to one embodiment of the present invention. Each file server 1, 2, or 3 includes a driver 101, 201, or 301, a local file system 102, 202, or 302, a network file system 103, 203, or 303, a resource manager 104, 204, or 304, and a switching program 105, 205, or 305 (also referred to as "switching program module").

The storage volumes above are denoted by numerals 521, 522, 523, 531, 532, 533, 541, 542, and 543. These volumes are defined by disk controller 51 of the storage system 90.

Drivers 101, 201, and 301 and local file systems 102, 202, and 302 are used for accessing the storage volumes. That is, driver 101 and local file system 102 cooperate with each to access the storage volumes that are associated with FC interface 53. Driver 201 and local file system 202 cooperate with each other to access the storage volumes that are associated with FC interface 54. Driver 301 and local file system 302 cooperate with each other to access the storage volumes that are associated with FC interface 55. Network file systems 103, 203, and 303 process the file access requests received from clients 8 in accordance with NFS (Network File System) or CIFS (Common Internet File System) protocol.

Each resource manager 104, 204, or 304 measures the load of each file server 1, 2, or 3, respectively, and reports to a system manager 61 in console 6. Switching programs 105, 205, and 305 are used for migrating part of the load of each file server 1, 2, or 3 to another file servers 1, 2, or 3. This is done by transferring a file system or volume from one file server to another, as explained in more detail later.

As explained above, disk controller 51 defines a plurality of storage volumes using disks 52. The storage volumes are commonly referred to as logical volumes in the art since they are logical partitions, rather than not physical partitions. Disk controller 51 also assigns each of the logical volumes to one of FC interfaces 53, 54, and 55 to enable a file server associated with that FC interface to access the logical volume. This assignment process is referred to as volume mapping in the present embodiment. Of course other terms may be used to refer to this process.

A logical volume may be assigned to more than one FC interfaces. However, for illustrative purposes, this embodiment is described with assumption that each logical volume is assigned to only one of FC interface.

In the present embodiment, logical volumes 521, 522, and 523 are assigned to FC I/F 53, logical volumes 531, 532, and 533 are assigned to FC I/F 54, and logical volumes 541, 542, and 543 are assigned to FC I/F 55. In addition, the disk storage includes unused logical volumes 550, i.e., backup volumes, that are normally not assigned to any of the FC I/Fs. They are used or assigned as a need arises. For example, the backup volume may be used to store a copy of a file system to be reassigned to another file server, as explained later. The disk controller 51 generally performs the volume mapping operation when system manager 61 of the console issues such a command to disk storage 5.

Figure 3:
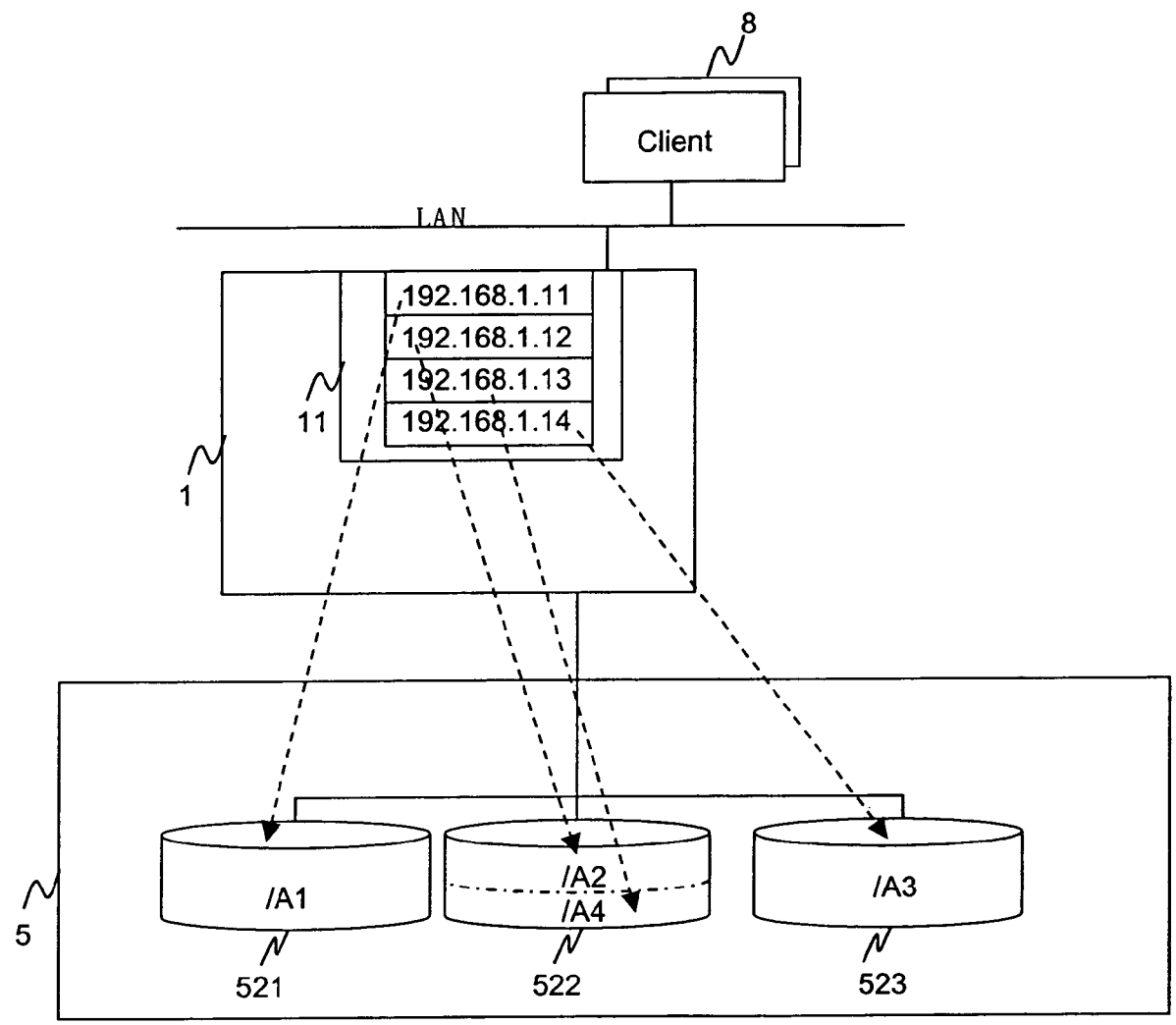
FIG. 3 shows a file server and its LAN I/F according to one embodiment of the present invention.

FIG. 3 shows a file server and its LAN I/F according to one embodiment of the present invention. Each LAN I/F 11, 21, or 31 of the file server has one or more IP addresses according to the present embodiment. Each IP address is uniquely associated with one of the file systems that is assigned to the file server. LAN I/F 11 of file server 1 is representatively illustrated in FIG. 3. LAN I/F 11 has four IP addresses of the file systems that are assigned to file server 1, i.e., file systems A1, A2, A3, and A4. These file systems may also be considered as being assigned to LAN I/F 11. As illustrated, one or more file systems may be provided in a given logical volume in the present embodiment.

Before the clients 8 can access the file system A1 that resides in the logical volume 521, users instruct the clients 8 to mount the file system A1. The following is an exemplary command used to mount the file system: mount 192.168.1.11:/A1/usr1. In the mount operation, a host name (i.e., the name of a file server) may be used instead of IP address. After the mount operation, clients 8 can access the file system A1 using NFS protocol.

FIG. 4 shows a volume mapping table 400 according to one embodiment of the present invention. The table is used to manage the mapping between the IP address and file system, mapping between logical volumes and file systems. The table also indicates the current workload of each file system that is assigned to a given file server. Accordingly, the table may also be referred to as "a resource table." Each resource manager 104, 204, or 304 manages such a table and periodically transmits the contents of the table to system manager 61 that is provided in the console.

More specifically, the table includes a plurality of records or entries 451, 452, 453, and 454. Each record or entry corresponds to a file system. These records provide mapping information and load information that are referred to above since each record is associated with an IP address field 401, a device field 402, a file system field 403, and a load field 404.

The IP address field shows the IP addresses assigned to the LAN I/F 11, 21, or 31. Host names (i.e., the file server names) can also be used instead of IP addresses. The device field indicates logical volume numbers. Each logical volume in the disk storage is provided with its own identification number. The file system field indicates the name of the file system that resides in the logical volume specified in the device field. For example, the record 451 indicates that the file system A1 is defined in the logical volume 521 and is assigned the IP address of 192.168.1.11.

The load field 404 indicates the current workload for a given file system in terms of I/O per second (IOPS) in the present embodiment. As the name suggests, IOPS provides information as to the number of disk I/Os received per second by a given file system. For example, the record 451 indicates that 400 IOPS are directed to the file system A1. Each resource manager 104, 204, or 304 periodically (e.g. once in a second) measures the workload for a given file system, and records the value of the workload to the volume mapping table 400.

Referring to FIG. 5, system manager 61 creates a workload table 600 by collecting information from the volume mapping table 400 of each file server 1, 2, 3. A node field 601 includes the identifier of each file server 1, 2, or 3. A load field 602 indicates the workload of each file server. The value for the load field is obtained by summing the workloads of all file systems that are managed by a given file server. For example, file server 1 manages four file systems (FIG. 4). The workload for each file system is 400, 200, 150, 350, respectively. The value for the load field, therefore, is 1100, which indicates the total workload of file server 1. This calculation may be done at the file server level or system manger level according to the implementation.

A threshold field 603 indicates a predefined value. Generally this value is set by an administrator. In the present embodiment, the threshold value is 400. That is, if the difference between the most busiest file server (whose workload is heaviest) and the least busiest file server (whose workload is lightest) exceeds the threshold value, the file server system 90 initiates the load balancing operation. The process of the load balancing operation is described below.

Figure 6:
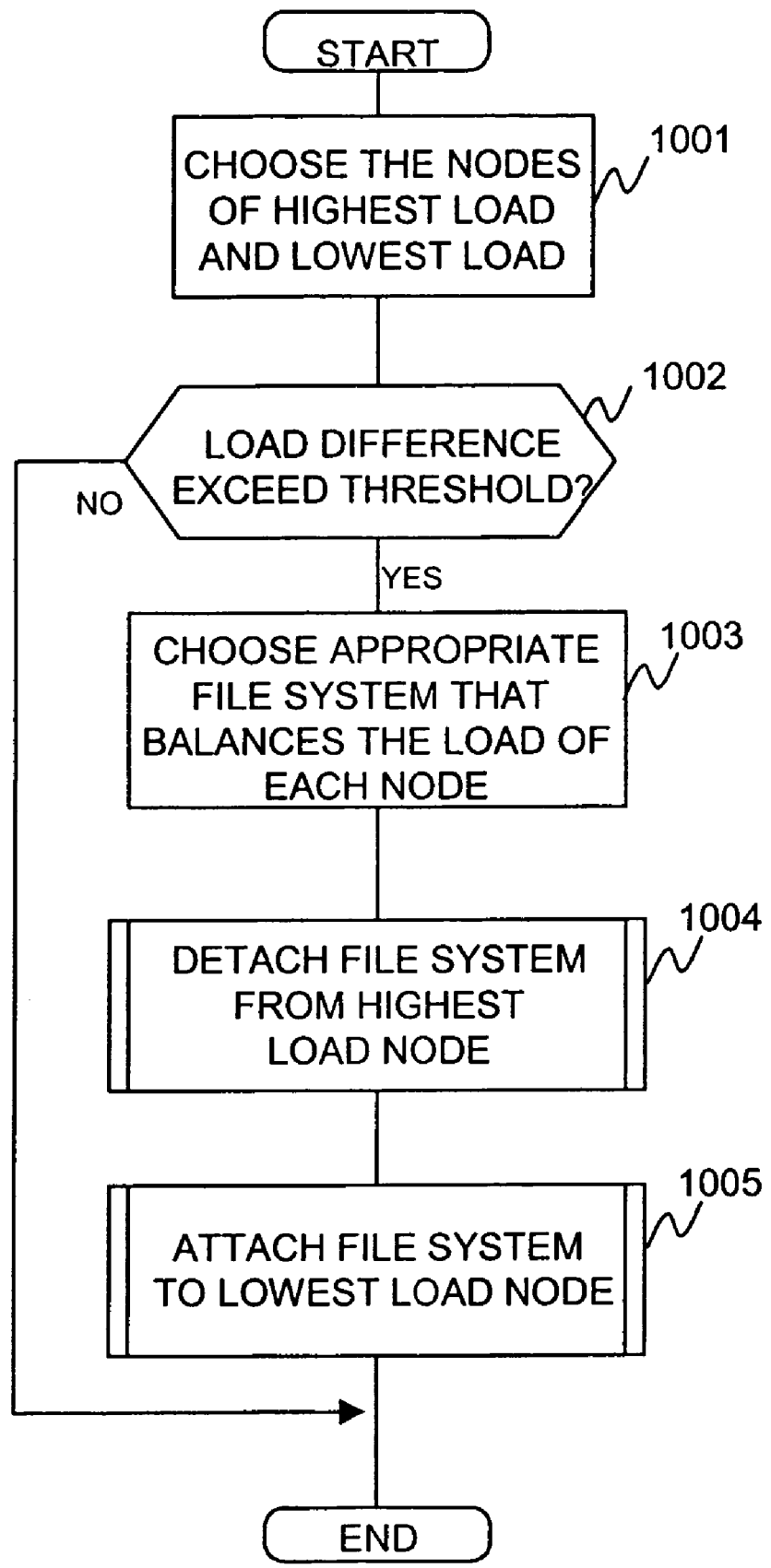
FIG. 6 illustrates a process performed by a system manager in a console according to one embodiment of the present invention.
Figure 7:
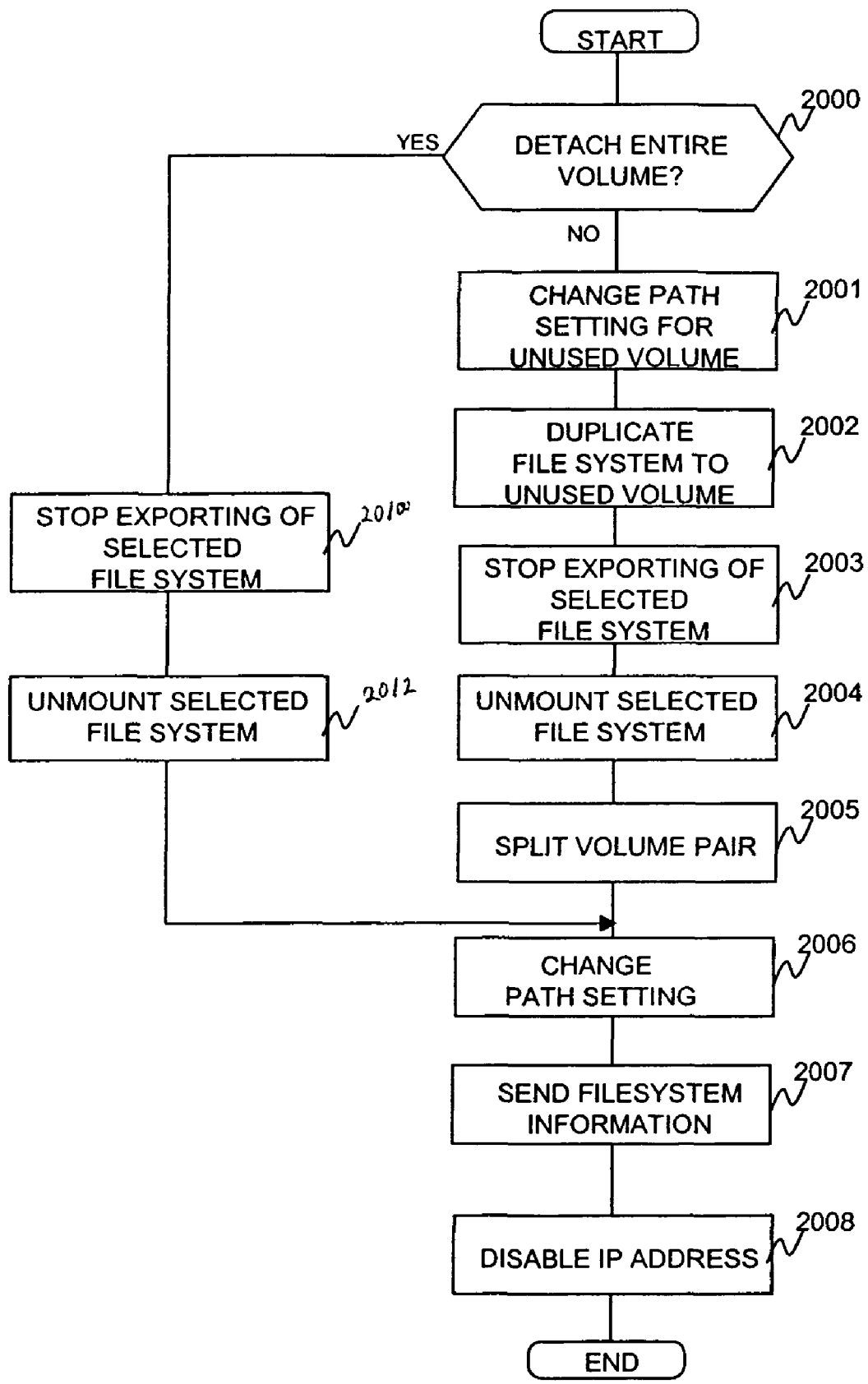
FIG. 7 illustrates a process for detaching a file system from a file server according to one embodiment of the present invention.
Figure 8:
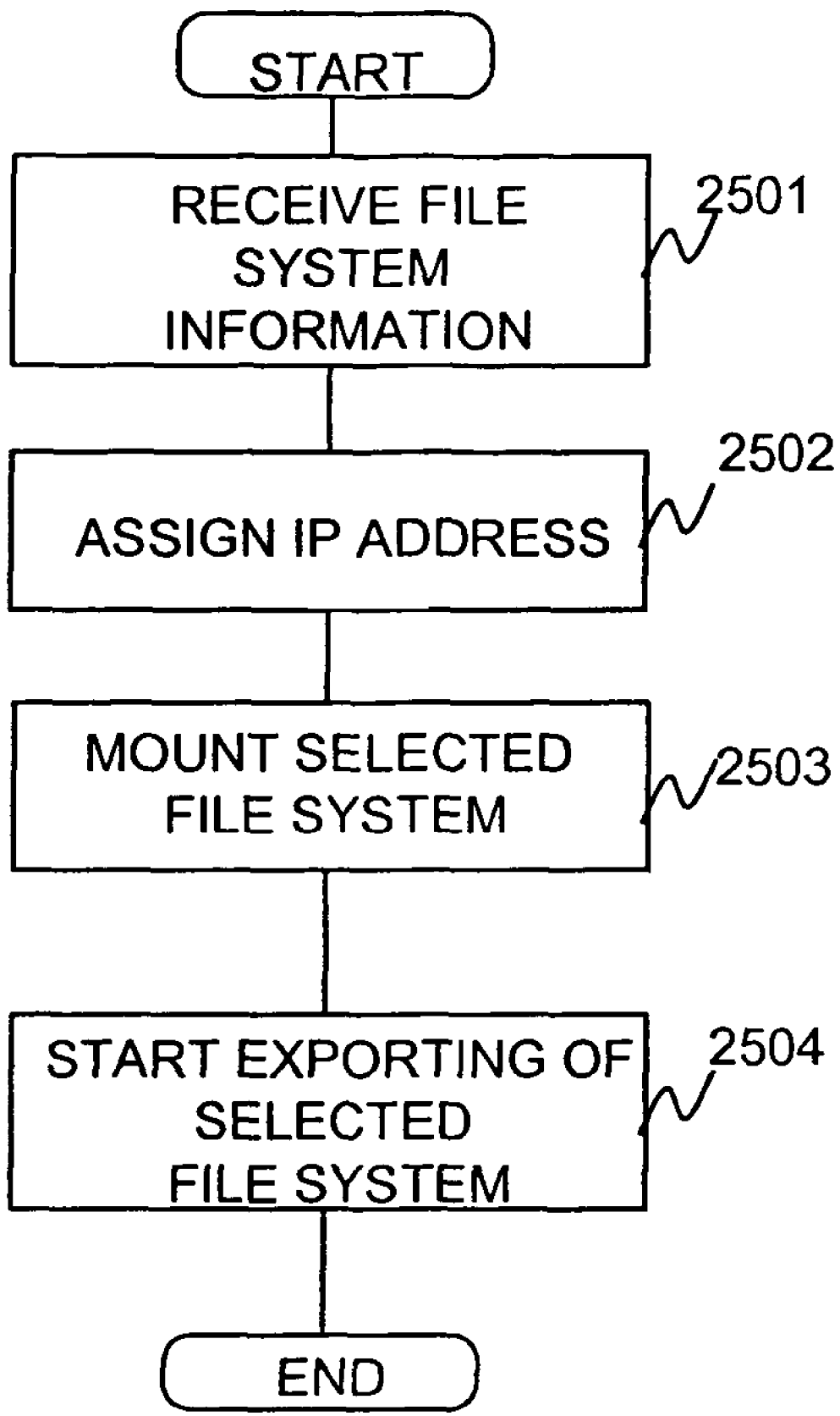
FIG. 8 illustrates a process for attaching a file system according to one embodiment of the present invention.

FIGS. 6, 7, and 8 illustrate processes performed by file server system 90 to balance the loads of the file servers 1, 2, and 3 according to one embodiment of the present invention. FIG. 6 illustrates a process performed by system manager 61 of the console. System manager 61 executes this process periodically (e.g. once an hour). At step 1001, nodes or file servers that are experiencing the heaviest and lightest loads in the system 90 are selected by examining the workload table. The difference between the loads of these file servers are determined, i.e., the difference value of IOPS from table 600. System manager 61 then determines whether or not the difference value exceeds the threshold value as defined in table 600 (step 1002). If the difference exceeds the threshold value of 400 in the present implementation, the process proceeds to step 1003. Otherwise, the process ends.

At step 1003, the system manager chooses an appropriate file system in the file server with the heaviest load in order to balance the workload of these file servers. Below provides a rule/algorithm for choosing an appropriate file system for reassignment according to one embodiment of the present invention.

1. Select a file system from a first file server, i.e., the file server with the heaviest load, and move the selected file system to a second file server, i.e., the file server with the lightest load. Then estimate the resulting workloads of the first and second file servers.
2. If the estimated workload of the first file server is equal to the estimated workload of the second file server, the system manager determines that the selected the file system should be moved. Otherwise, another file system is selected from the first file server and so on.
3. If there is no file system that matches the condition (2), the file system from the first file server that would make the estimated workload of the first file server the closest to that of the second file server is moved to the second file server.

For example, if the workloads of file server 1, 2, and 3 are as indicated in FIG. 5 and the workloads of the file systems are as indicated in FIG. 4, the file system A3 of file server 1 is moved to file server 2. The difference in workloads of the file servers 1 and 2 is changed from 600 IOPS to 100 IOPS after file system A3 has been moved to file server 2.

In another embodiment, before the process proceeds to step 1004, the confirmation message is displayed on console 6 whether or not the selected file system should be migrated to another file server. In yet another embodiment, the process only displays the message on the GUI screen of the console 6 and merely suggests where the selected file system (for example, file system A3) should be migrated. That is, the process does not itself execute the following steps to move the file system. Rather, it is the administrator who actually initiates the migration of the file system upon reviewing the suggestion.

Referring back to the process, at step 1004, system manager 61 instructs the file server 1 to detach the file system A3. The steps involved in detaching a file system is provided in FIG. 7.

After the file system A3 has been detached, system manager 61 instructs the file server 2 to attach the file system A3 in the file server 2 (step 1005). The steps involved in attaching a file system is provided in FIG. 8.

FIG. 7 illustrates a process for detaching a file system from a file server according to one embodiment of the present invention. This detachment process is executed by a switching program in a file server in the present embodiment. The detachment process is described herein using the above example, where file server 1 is the file server with the heaviest load and file server 2 is the file server with the lightest load, where file system A3 is moved from file server 1 to file server 2.

At step 2000, switching program 105 of file server 1 determines whether or not the entire logical volume wherein the selected file system (e.g., filer system A3) resides is to be detached. That is, whether or not the logical volume in question has any other file system defined therein. If another file system resides in the volume, switching program 105 determines that only a portion of the volume should be detached and proceeds to step 2001.

On the other hand, it there is no other file system that is defined in the volume, switching program 105 determines that it should detach the entire volume since the selected file system corresponds to the entire volume. The process then proceeds to step 2010 and then to step 2012. These steps correspond to steps 2003 and 2004 explained below.

At step 2001, switching program 105 instructs system manager 61 to change the volume mapping so that file server 1 can access one of the unused logical volumes, e.g., volume 550 (see FIG. 2). Switching program 105 selects that unused logical volume or backup volume and duplicates the selected file system to the backup volume (step 2002). For this purpose, switching program 105 initiates a volume mirroring operation or function. Disk storage 75, in response, performs the volume mirroring operation. The mirroring operation is described in more details below in connection with FIG. 9.

At step 2003, switching program 105 instructs the network file system 103 to stop exporting the selected file system. The export of the file system is stopped by disabling the communication between clients 8 and network file system 103. That is, the file server 1 is instructed not to allow clients 8 to access the file system via NFS or CIFS. Switching program 105 instructs the local file system 102 to unmount the selected file system (step 2004). The file system is unmounted by disabling the communication between local file system 102 and FC interface 53 of the selected logical volume. Switching program 105 splits the pair status of the selected volume and the backup volume (step 2005). Once unmounted, the clients 8 cannot access the selected volume so the contents of the selected volume and the backup volume remain the same.

At step 2006, switching program 105 instructs system manager 61 to change the volume mapping so that file server 2 can access the backup volume wherein the copy of the file system A3 resides.

Switching program 105 sends the information about the selected file system A3 to the system manager 61 (step 2007). The information about the selected file system includes the file system name, IP address associated with the file system, and the volume number that the backup volume wherein the copy of the selected file system resides. Switching program 105 then disables the IP address that is associated with the selected file system A3 (step 2008). At the same time, the entry 454 in the resource table 400 is also deleted. This is done on the resource table 400 maintained by switching program 105 according to the present embodiment.

Referring back to step 2000, if switching program 105 determines that entire volume is to be detached, the switching program stops exporting of the selected file system A3 (step 2010) without duplicating the file system. The file system is unmounted as in step 2004 (step 2012). Thereafter, the volume mapping of the volume including the selected file system is changed (step 2006). That is, the volume that is mapped to the file server 1 or FC I/F 53 is re-mapped to the file server 2 or FC I/F 54. Steps 2007 and 2008 are then performed.

FIG. 8 illustrates a process for attaching a file system according to one embodiment of the present invention. The above example is continued to be used to describe the attachment process. At step 2501, switching program 205 of file server 2 receives from system manager 61 the information about the file system A3 that has been moved. When file system A3 in the file server 1 is moved to file server 2, the file system A3 is copied to the backup logical volume (assuming the volume 523 includes another file system), as explained above. In this case, system manager 61 informs the switching program 205 of the volume number of the backup volume wherein the copy of the file system A3 resides. Switching program 205 enables the received IP address in file server 2 by assigning the IP address to the file system A3 in its table 400 (step 2502). The file system is mounted (step 2503). Switching program 205 exports the file system A3 to enable the clients to resume accessing the file system A3 (step 2504).

FIG. 9 illustrates a mirroring operation according to one embodiment of the present invention. This mirroring operation is used to perform the attachment and detachment processes described above. Disk storage 5 has a volume mirroring function that creates a duplicate copy of all of a given logical volume (source volume) or a portion thereof to another logical volume (target volume), e.g., the backup volume 550. When users or the file servers 1, 2, and 3 instruct the disk storage 5 to make a duplicate copy of a specified region of the source volume, disk storage 5 starts copying that region of the source volume to the target volume sequentially (from the beginning to end of the desired portion). This operation is typically referred to as "an initial copy operation" since the target volume mirrors the source volume's initial state.

Thereafter, when the file servers 1, 2, and 3 write data to the specified region of the source volume, the write data are also copied to the target volume, so that the target volume continues to mirror the source volume. This subsequent operation is typically referred to as "an update copy operation." The state after the initial copy has been completed is typically referred to as "Duplicate State." In the present embodiment, the update copy operation may be performed only after the duplicate state has been obtained.

The file server system 90 is configured to allow users or the file servers 1, 2, and 3 to instruct disk storage 5 to stop the duplicate state. When the Disk Storage 5 is instructed to stop the duplicate state, the state is placed to the "Split State". That is, the two volumes are de-linked or no longer paired for mirroring. Accordingly, in split state, neither initial copy nor update copy operation can be performed. The above volume mirroring function may be used to provide duplicate copies of multiple file systems residing in a logical volume or a duplicate copy of entire source volume if only one file system is defined in the source volume.

Figure 10:
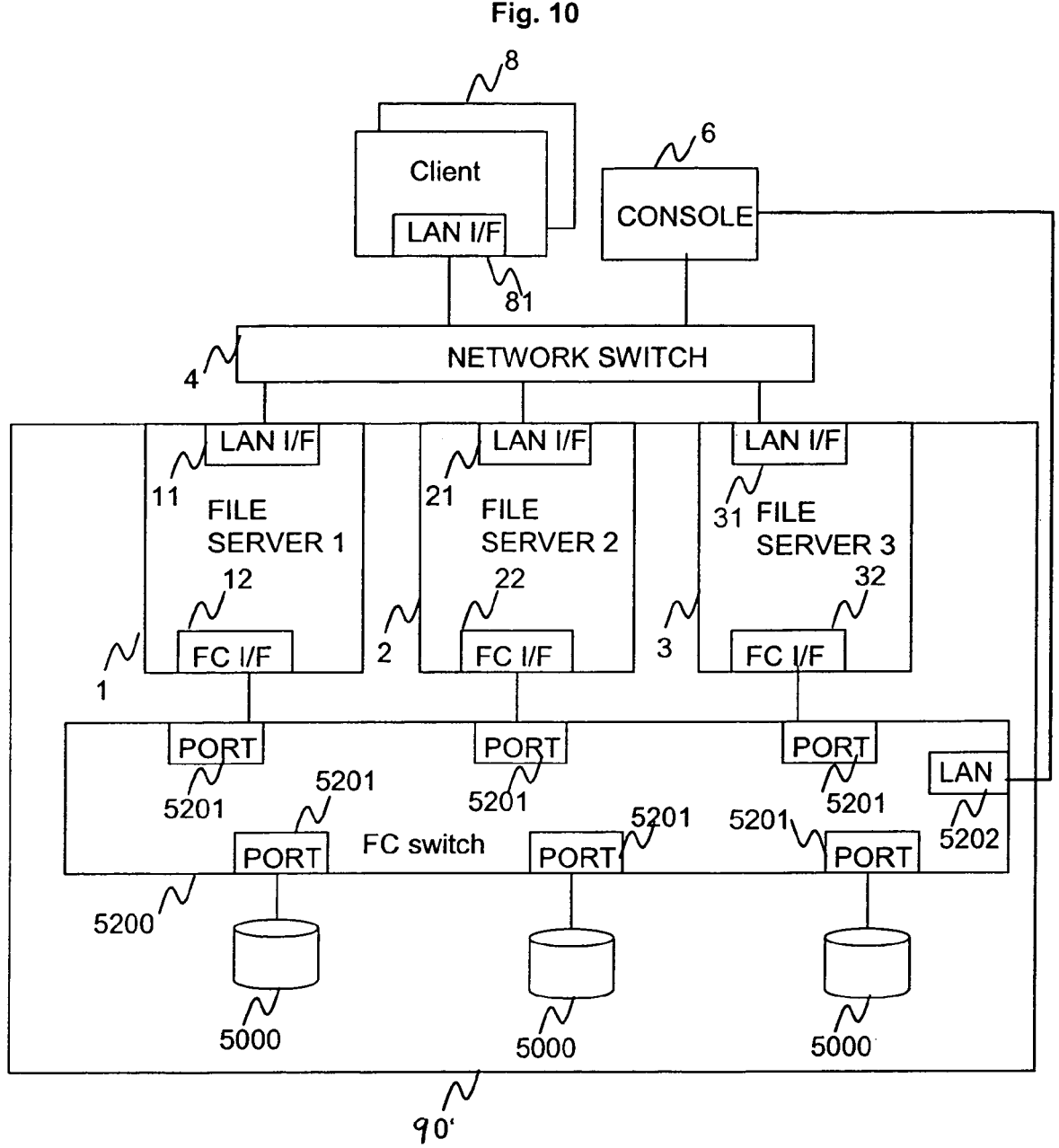
FIG. 10 illustrates a file server system according to another embodiment of the present invention.

FIG. 10 illustrates a file server system 90' according to another embodiment of the present invention. The configuration of the file server system 90' is substantially the same as that of the system 90 in FIG. 1. Some of the differences are that system 90' includes a plurality of disks 5000 and a Fibre Channel switch 5200 rather than disk storage 5 of system 90. The FC switch 5200 includes a plurality of ports 5201 that is coupled the file servers 1, 2, and 3, and disks 5000. The switch also includes a LAN 5202 that is coupled to the LAN interfaces of the file servers. The switch could be part of a storage area network in certain implementations.

Figure 11:
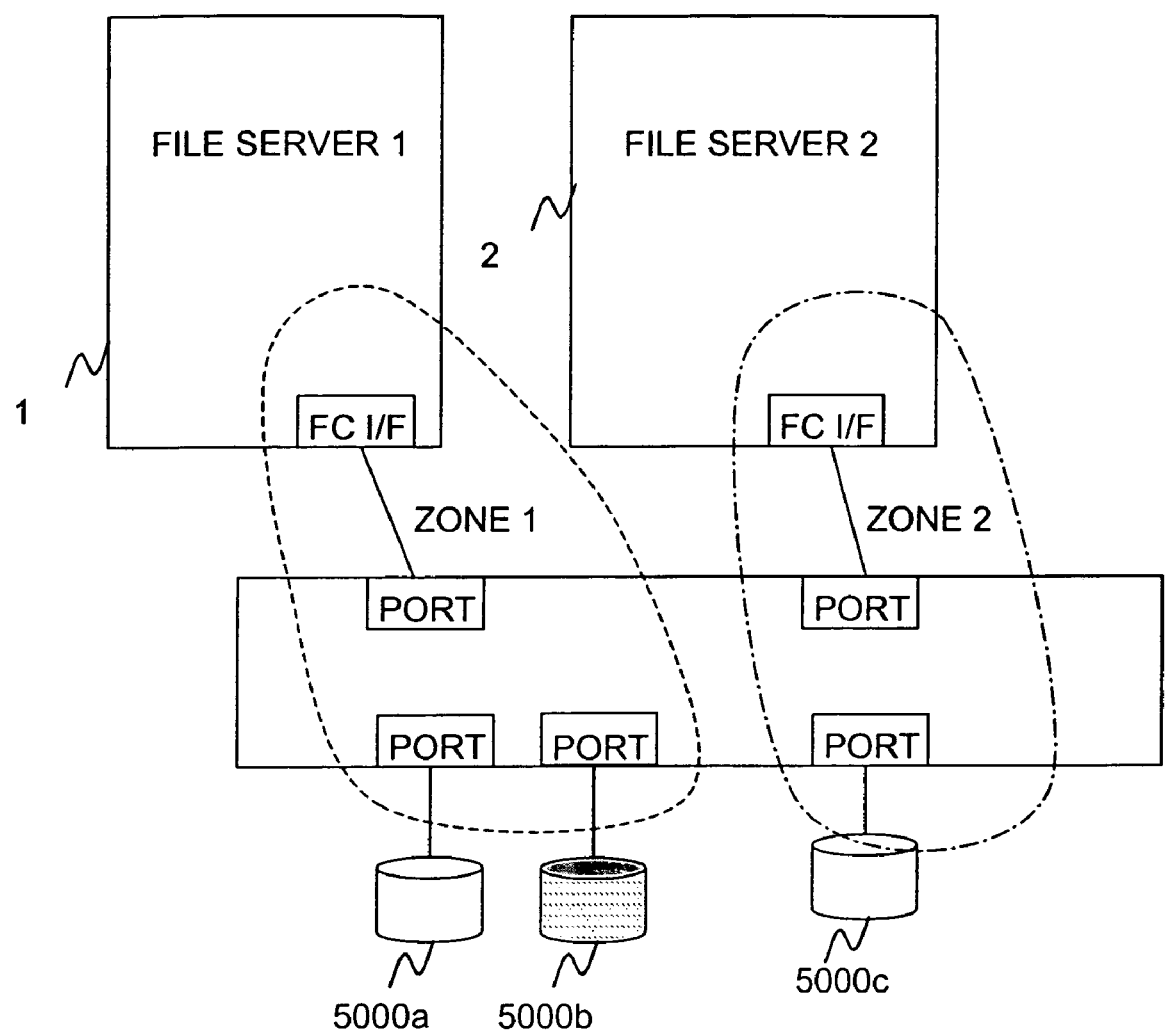
FIG. 11 illustrates the steps involved in the zoning function according to one embodiment of the present invention.

In system 90', instead of volume mapping in the disk storage 5, a zoning function associated with FC switch 5200 is used. FIG. 11 illustrates the steps involved in the zoning function according to one embodiment of the present invention. Zoning is the feature of the FC switch 5200 that assigns a given file server to a set of ports, so that the file server may communicate and access only the ports that have been assigned to it. That is, a "barrier" is created within the FC switch.

For example, in FIG. 11, the file server 1 is assigned to a set of ports in a zone referred to as ZONE 1. Disks 5000*a* and 5000*b* are also assigned to ZONE 1. On the other hand, file server 2 and disk 5000*c* are assigned to ZONE 2. These components are grouped respectively to their zones.

Once these components are grouped to a particular zone, the zoning feature prohibits the communication (for purposes of accessing data) between components in different zones. Accordingly, the file server 1 is allowed to use the ports in ZONE 1 to access disks 5000*a* and 5000*b*, but is not allowed to access the ports in ZONE 2 to access disk 500*c*.

Figure 12:
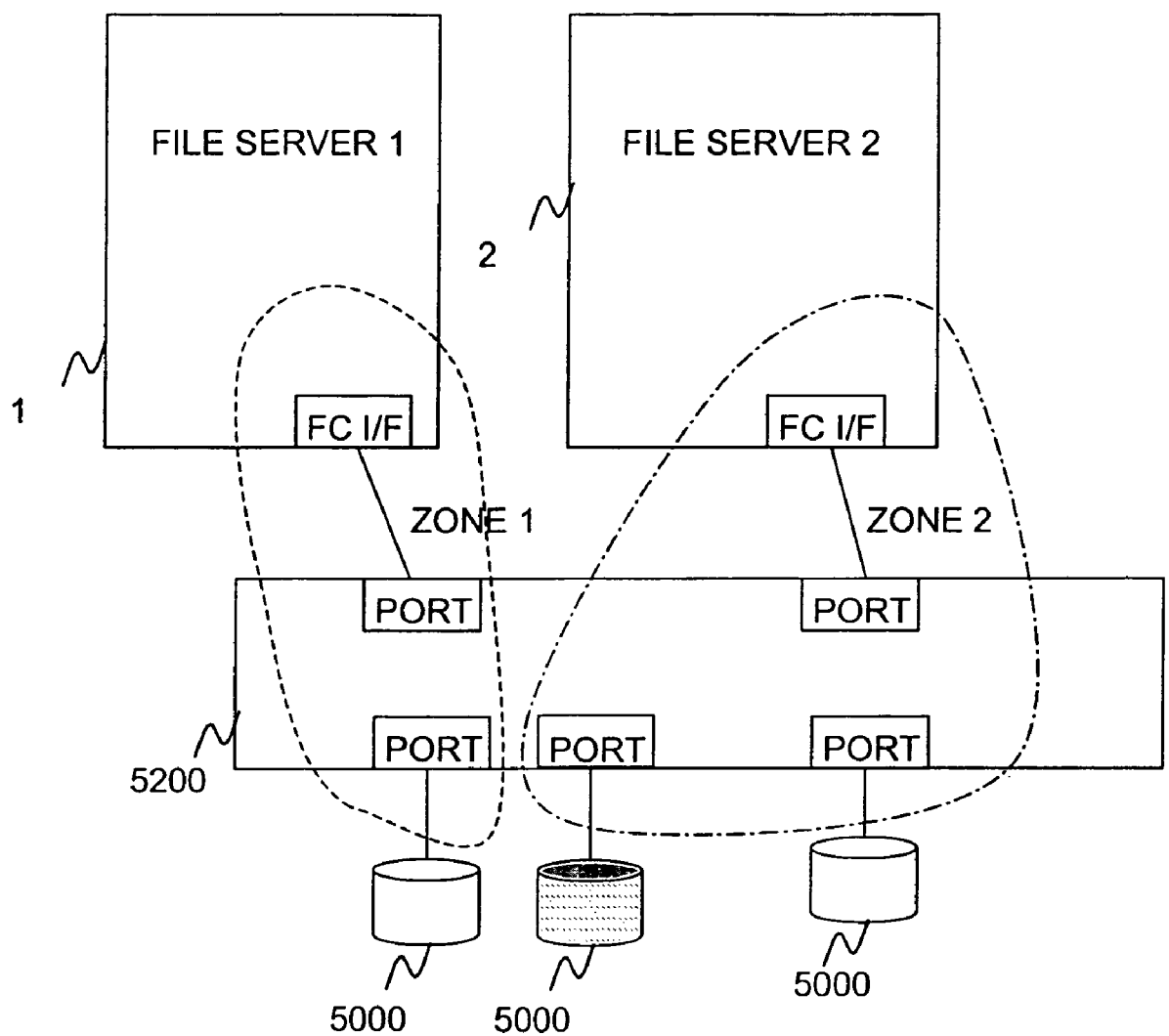
FIG. 12 illustrates redefinition of zones according to one embodiment of the present invention.

The zoning feature provides similar functionality of volume mapping. The access to a given disk may be changed by redefining the zones, as shown in FIG. 12. File server 2 is allowed to access disk 5000*b* by including disk 5000*b* in ZONE 2. File server 1, which is now in a different zone, is not allowed to access disk 5000*b* once the zones have been redefined.

Figure 13:
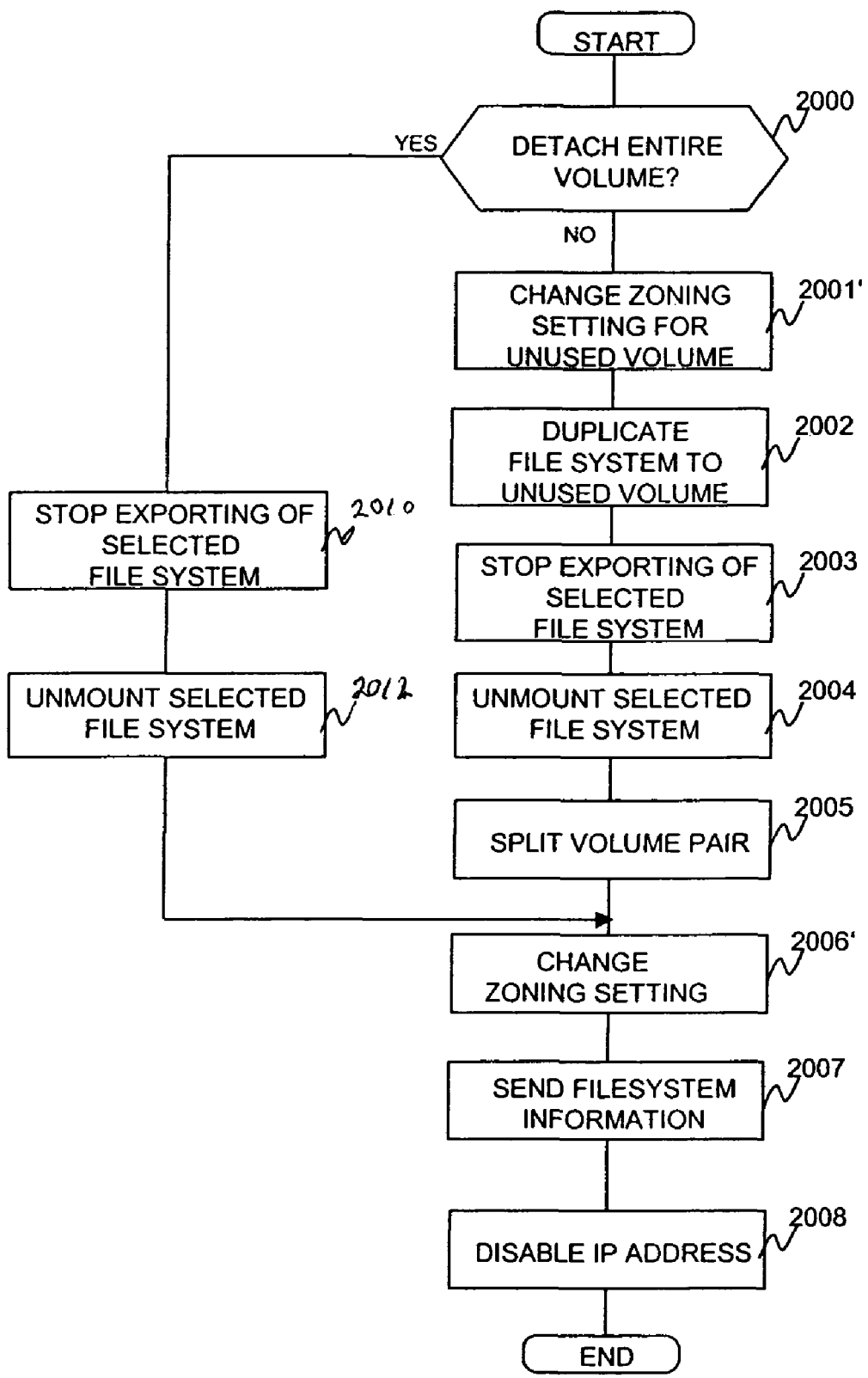
FIG. 13 illustrates a detachment process associated with system according to one embodiment of the present invention.

The file server system 90' performs the load balancing using a process that is similar to that used by system 90. One difference is the detachment operation. FIG. 13 illustrates a detachment process associated with system 90' according to one embodiment of the present invention. System 90' performs steps 2001' and 2006' that is different from steps 2001 and 2006 of the system 90 (see FIG. 7). At step 2001, a switching program of a file server instructs system manager 61 to change the zoning setting of the FC switch 5200, so that file server 1 can access one of the backup logical volumes. At step 2006', the switching program instructs system manager 61 to change the zoning setting, so that file server 2 can access the backup logical volume wherein the copy of the file system resides.

FIGS. 14-22 illustrates load balancing of storage systems having multiple host interfaces and processors according to embodiments of the present invention. The storage system described below comprises a plurality of processors, a plurality of storage volumes, and a plurality of interconnecting components (e.g., communication interfaces) to couple the plurality of processors and the plurality of volumes together. The storage system detects the occurrence of performance bottleneck and applies an appropriate load balancing method in accordance with the cause of the bottleneck. The bottleneck may be caused by various different components within the storage system, e.g., by a network port that couples a file server to clients, or a storage port that couples a storage unit to a file server, or a processor within the file server. Accordingly, the embodiments of the invention relate to diagnosing the cause of bottleneck and implementing a load balancing method based on the bottleneck diagnoses. In other embodiments, one or more load balancing methods may be performed without performing the bottleneck diagnoses.

Figure 14:
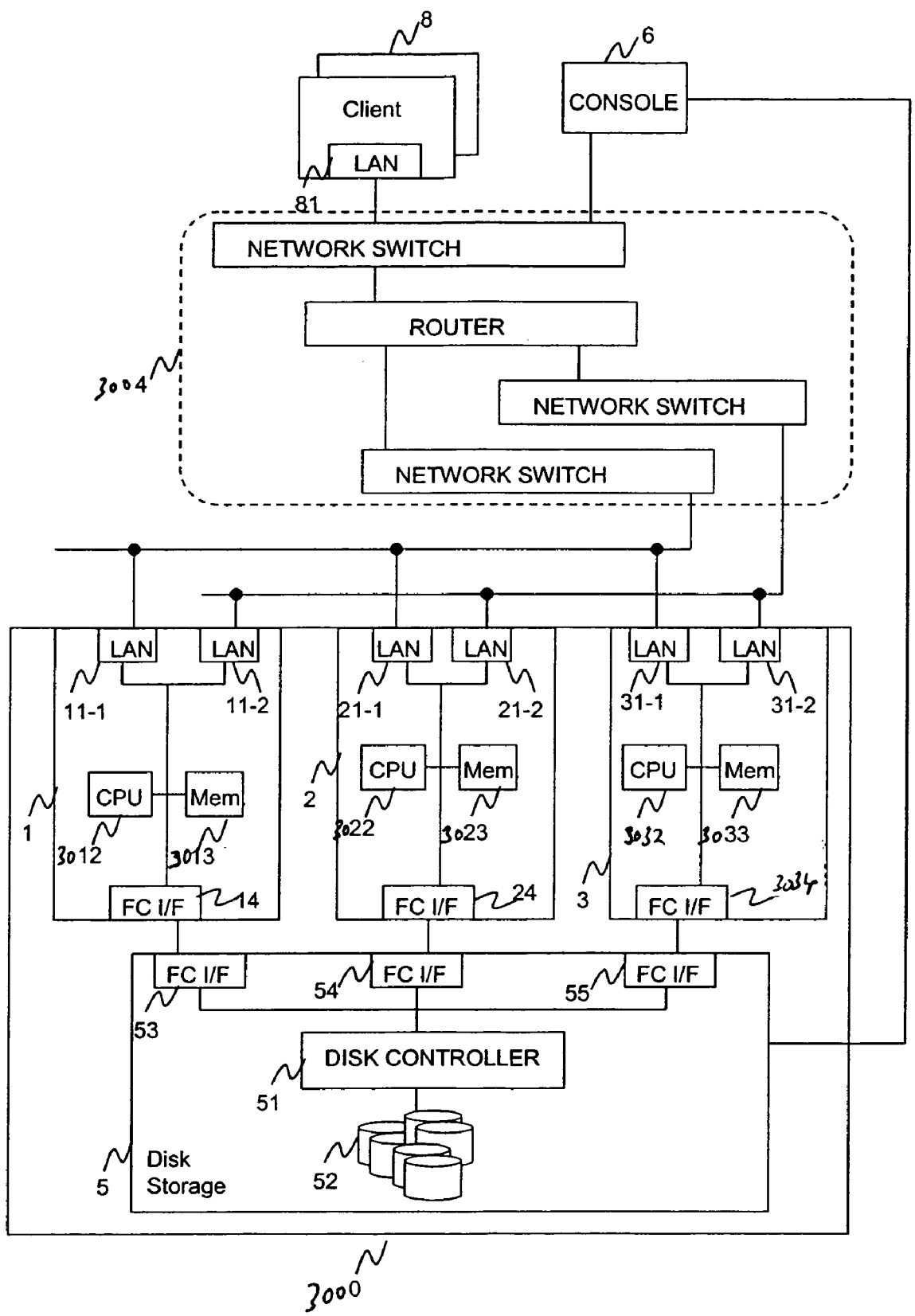
FIG. 14 illustrates a storage system according to one embodiment of the present invention.

FIG. 14 illustrates a storage system 3000 according to one embodiment of the present invention. The storage system 3000 corresponds to the storage system 90 of FIG. 1. Like numbers are used for like components, where possible. Storage systems 90 and 3000 have substantially identical configuration. One difference is that storage system 3000 includes two or more network ports (e.g., LAN interfaces) for its file servers 1, 2, and 3. That is, LAN interfaces 11-1 and 11-2 are assigned to file server 1; LAN interfaces 21-1 and 21-2 are assigned to filer server 2; LAN interfaces 31-1 and 31-2 are assigned to file server 3. As used herein, storage system 3000 may be referred to as a file server system or storage subsystem.

As illustrated in FIG. 2, each file server includes switching program, resource manager, network file system, local file system, and driver. Each resource manager 104, 204, or 304 measures the load of each file server 1, 2, or 3, respectively, and reports the results to the system manager 61 in console 6. Switching program 105, 205, and 305 is used for load balancing within a file server or between file servers.

System manager 61 provides graphical user interfaces (GUI), and users operate the GUI for viewing and changing configuration of the file server system 3000, including load balancing operations. In another embodiment, some of the function of the system manager 61 may reside in one or more of the file servers 1, 2, and 3.

Figure 15:
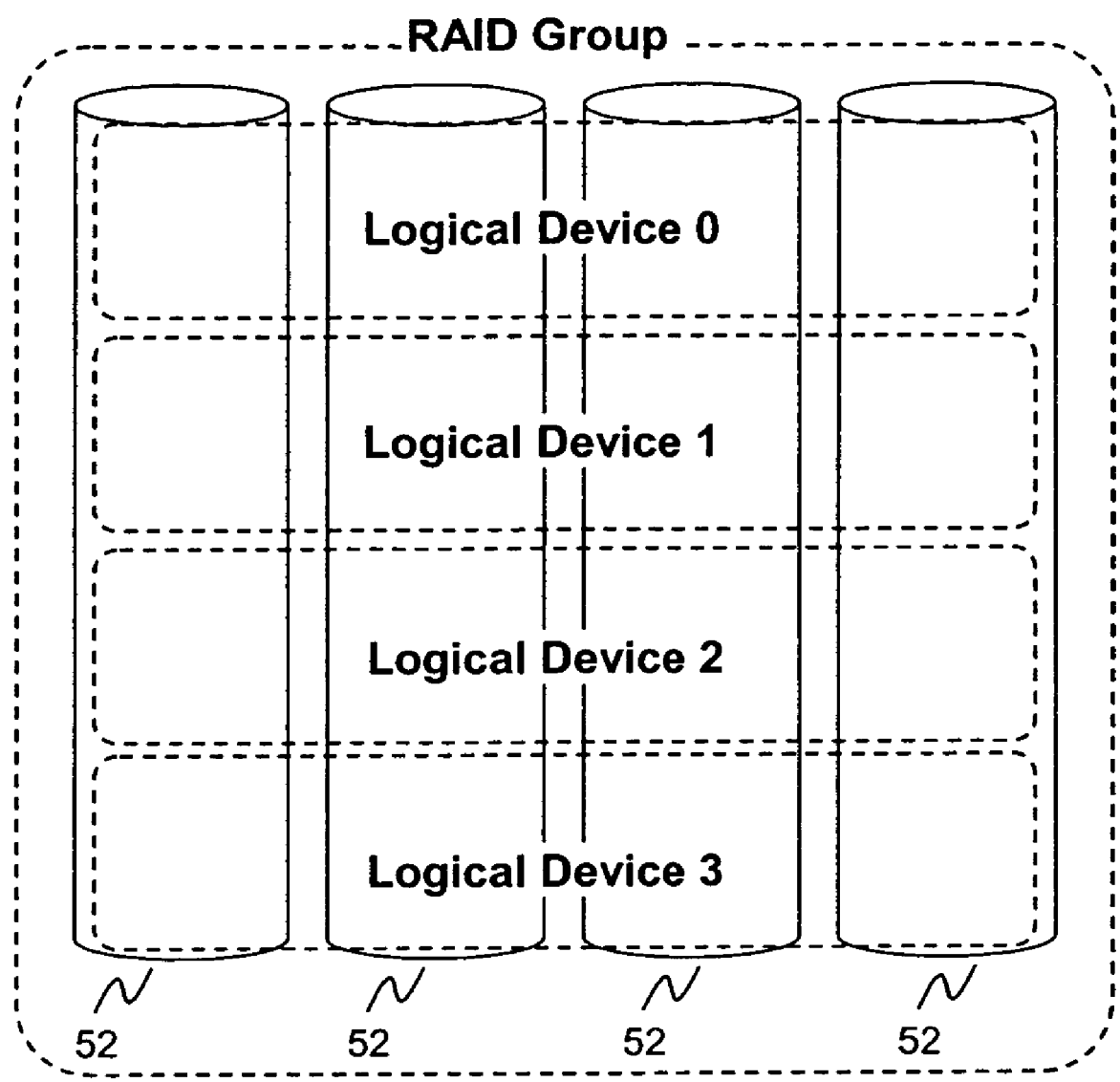
FIG. 15 illustrates a plurality of logical devices that are defined using disks in the disk storage (or storage unit) according to one embodiment of the present invention.

FIG. 15 illustrates a plurality of logical devices that are defined using disks in the disk storage (or storage unit) 5 according to one embodiment of the present invention. In present implementation, the disk storage 5 includes a plurality of disks 52 and may be referred to as a disk array unit. One or more of logical devices of FIG. 15 are defined in a Redundant Arrays of Inexpensive Disks (RAID) group. Each RAID group generally includes a plurality of disks 52. Each RAID group generally has its unique number starting from 0. This number is called RAID group number. Each logical device has its unique identification number starting from 0. This number is referred to as a logical device number. A file system is constructed in a logical device. Disk storage 5 has a plurality of RAID groups.

Disk controller 51 defines a plurality of logical devices or logical volumes using a plurality of disks 52. Disk controller 51 also assigns each logical device to file servers 1, 2, and 3. This assignment process is referred to as volume mapping. A single logical device may be uniquely assigned to a given file server or shared by a plurality of file servers according to application. One or more logical devices are left unassigned to the file servers (see logical devices 550 in FIG. 2), for their use subsequently.

In the present embodiment, logical devices 521, 522, and 523 are assigned to FC I/F 53, logical devices 531, 532, and 533 are assigned to FC I/F 54, and logical devices 541, 542, and 543 are assigned to FC I/F 55 (see FIG. 2). Logical devices 521, 522, and 523 may be defined in the same or different RAID groups. Similarly, logical devices 531, 532, and 533 (or 541, 542, and 543) may be defined in the same or different RAID groups.

Figure 16:
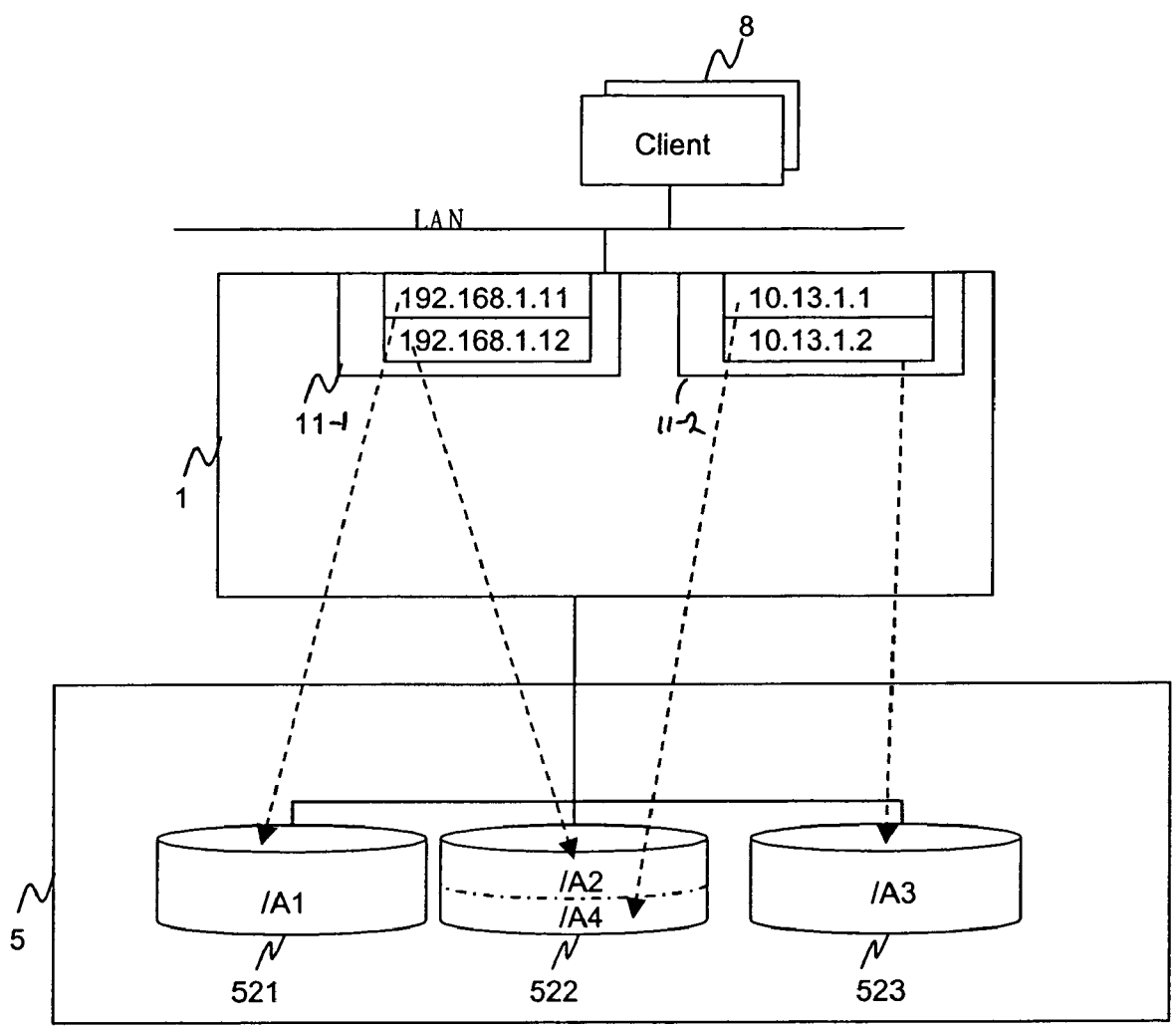
FIG. 16 illustrates a file server with a plurality of LAN I/Fs according to one embodiment of the present invention.

FIG. 16 illustrates a file server with a plurality of LAN I/Fs according to one embodiment of the present invention. Each LAN I/F 11-1, 11-2, 21-1, 21-2, 31-1, or 31-2 has one or more IP addresses that are mapped to file systems in the disk storage 5 in the present implementation. The same IP address may be mapped or associated with more than one file systems.

In addition to mapping operation within the storage system 3000, the file system also need to be mounted by clients 8 before clients 8 can access the file systems (e.g., file system A1 that resides in the logical volume or logical device 521). For example, users instruct clients 8 to mount the file system A1 using the following command: mount 192.168.1.111:/A1/usr1. Host name, instead of IP address, can be used in the mount operation. After the mount operation, clients 8 can access the file system A1 using a suitable protocol (e.g., NFS protocol).

In the present embodiment, each of the file systems in file server 1, 2, or 3 can be mounted using another IP address that is assigned in the file server. In other embodiments, the file servers have means for prohibiting clients from mounting the file systems using the IP addresses that are assigned in the file server but that are not associated with the file systems.

Referring back to FIG. 14, each file server 1, 2, or 3 monitors the workload of the CPU, file systems, and LAN I/Fs. In one implementation, the workload information of each is maintained at each file server, respectively. The workload information may also be transferred to the system manager 61, so that the system manager 61 may maintain the workload information of all file servers.

FIG. 17 illustrates a resource management table 3400 that the system manager 61 maintains according to one embodiment of the present invention. Table 3400 is used to manage the relationship among RAID groups, logical devices, and file systems. The table comprises the following elements: RAID Group number (RAID Gr. #) 3401, Logical Device number (DEVICE #) 3402, NODE 3403, File system 3404, IP Address 3405, and LOAD 3406. NODE 3403 refers to the file server, e.g., node 1 refers to file server 1.

LOAD 3406 indicates the current workload for the corresponding file system. As the unit of the workload, IOPS (or the number of I/Os per second) is used in the present embodiment. That is, IOPS refers to the number of disk I/Os per second that is received by the file system. Other units of workload may be used, e.g., MB/sec. For example, for row 3451, the workload unit 400 indicates that the file system A1 has received 400 I/Os per second. In the present embodiment, 100 percent cache miss is assumed, so that the disk (logical device) is accessed for every I/O received by the file system. The total file system workload to a RAID group does not exceed the maximum workload of a RAID group.

Resource manager 104, 204, and 304 periodically (e.g., once a second) measures the workloads that are received from each of the file systems, and records the value of the workload to the of the resource management table 3400. For a logical device that is not assigned to any file system, its file system field 3403 would be NULL, and IP address field 3404 would be NULL, and load field 3405 would be NULL. Each resource manager 104, 204, or 304 at the file server maintains a subset of the workload table 3400.

FIG. 18 shows a LAN workload table 3700 that each resource manager 104, 204, or 304 maintains according to one embodiment of the present invention. Table 3700 includes LAN 3701 and LOAD 3702. LAN 3701 indicates the LAN I/Fs assigned to the file server. LOAD 702 shows the current workload of LAN I/Fs.

File servers 1, 2, and 3 monitor the processor utilization rate as well as the workload of LAN I/Fs. The processor utilization rate shows the percentage of the processor (CPU) capacity being used.

FIG. 19 illustrates a workload table 3600 that maintains predefined threshold workloads for various components in the file system 3000 according to one embodiment of the present invention. The value defined in table 3600 is used to indicate whether or not a given component is experiencing heavy workload. Accordingly, the value may be threshold value or maximum workload capacity. The maximum workload refers to the actual workload capacity of a component, and the threshold value/workload refers to a workload level at which bottleneck is presumed to occur for a component. For example, if the actual maximum capacity of LAN I/F is 100, then the threshold value may be defined as 90.

Resource managers 104, 204, and 304 know the maximum or threshold workload (or both) of each component of the file server system by accessing workload table 3600. A field 3611 lists the components in the file server system and a field 3612 lists the maximum or threshold workload associated with the components. The list of components maintained in workload table 3600 includes LAN I/Fs, processors, and disks. LAN 3601 shows the maximum/threshold workload for LAN I/Fs 11-1, 11-2, 21-1, 21-2, 31-1, or 31-2, PROC. 3602 shows the maximum/threshold workload for CPU 3012, 3022, or 3032, and DISK 3603 shows the maximum workload of each RAID group. The unit of workload is the same as that in the resource management table 3400. As used herein, for illustrative convenience, the terms "maximum workload" and "threshold workload" are used interchangeably unless specifically used otherwise from the context.

In the present implementation, each type of components are assigned the same maximum/threshold workload. The same type of components may be assigned different maximum workloads. For example, LAN I/F 11-1 may be assigned maximum workload of 5000 while LAN I/F 11-2 may be assigned maximum workload of 6000. Similarly, CPU 3012 of filer server 1 may be assigned maximum workload of 8000 while CPU 3013 of file server 2 may be assigned maximum workload of 6000. If the file server has a plurality of CPUs, each of them may be assigned different maximum workload, particularly if they have different performance capabilities.

In the present implementation, each file server maintains workload table 3600. Workload table 3600, however, may be maintained at different locations according to application, e.g., at console 6, or at only one of the file server, or both at the file servers and console, etc. As used in the present embodiment, this maximum workload level (MAX. LOAD 3612) refers to a workload level that preferably should not be exceeded for optimal performance and does not refer to actual maximum workload capacity of the component. However, the maximum workload level may refer to actual maximum capacity of the component in another implementation.

FIG. 20 illustrates a process 4000 for performing workload balancing according to one embodiment of the present invention. In the present embodiment, each file server performs the process 4000. Process 4000 is invoked if a file server 1, 2, or 3 determines if a workload for a component associated with the file server is greater than or equal to its predefined maximum workload in table 360. The process is invoked by the switching program 105 of the file server in the present implementation. Alternatively, the process may be initiated by a user using console 6 to instruct one of the file servers 1, 2, and 3 to execute the process. The user may give such an instruction if he or she determines that the file server system 3000 does not appear to be running at optimal level.

At step 4001, the workload of each component is checked by the file server. For example, process 4000 judges whether LAN, disk, and processor workload are full. In the present implementation, the processor workload balancing is given less priority, so that steps are taken to alleviate the processor workload last if process 4000 determines that the bottleneck is occurring at multiple locations, e.g., at processor and LAN and/or disks.

Referring back to step 4001, if MAX LOAD 3612 is the actual maximum capacity rather than threshold workload, the components would be determined to be working close to or at full capacity if their workload values for LOAD 3702 are close to the values defined for MAX LOAD 3612.

At step 4002, process 4000 checks whether or not the disk workload is full. For disk workload analysis, each file server monitors the file system workloads of each file system. The workload of a RAID group is calculated by summing all file system workloads that belong to the RAID group. If the calculated workload of a RAID group is equal to or greater than the MAX LOAD of DISK 3611, then the RAID group is operating close to or at full capacity. If the determination is YES, the process proceeds to step 4003. If NO, it branches to step 4004. At step 4003, the process executes disk workload balancing process. Details of the disk workload balancing process are explained later (see FIG. 21).

At step 4004, process 4000 determines whether or not LAN workload is full. For LAN workload analysis, each file server monitors the LAN workload and updates the LAN workload table 3700 in FIG. 18. If the LOAD 3702 of an LAN I/F is equal or greater than the MAX LOAD 3612 (here used as "threshold workload"), then the LAN I/F is operating close to or at full capacity and likely to be a source of bottleneck. If the determination is YES, the process proceeds to step 4005. If NO, it branches to step 4006. At step 4005, LAN workload balancing is performed. Details of the LAN workload balancing process are explained later (see FIG. 22). At step 4006, processor workload balancing is performed (see FIGS. 6-8).

FIG. 21 shows a process 4100 for disk workload balancing according to one embodiment of the present invention. Process 4100 corresponds to step 4003 of process 4000. At step 4101, resource management table 3400 is accessed to determine whether or not unused logical devices exist in another RAID group wherein the target logical devices do not reside. If the unused logical devices exist, process 4100 proceeds to step 4102. If not, it branches to step 4106.

At step 4102, process 4100 selects the least busiest RAID group that includes one or more of the unused logical devices. The unused logical device in that RAID group is selected, and simulation is performed to obtain the workload values if the new configuration is adopted (step 4103). If the new configuration improves the workload balance, process 4100 proceeds to step 4105 (step 4104). If not, it goes to step 4106.

At step 4105, process 4100 instructs disk storage 5 to migrate one or more logical devices in the busy RAID group to the selected, not-busy RAID group. A number of different migration methods may be used, as disclosed in U.S. Pat. No. 6,237,063, which is incorporated by reference. In another embodiment, before the process proceeds to step 4104, the confirmation message is displayed on console 6 whether or not the selected logical devices should be migrated to another logical devices. In yet another embodiment, the process only displays the message on the GUI screen of the console 6 and merely suggests where the selected logical devices should be migrated. That is, the process does not itself execute the following steps to move the logical devices. Rather, it is the administrator who actually initiates the migration of the logical devices upon reviewing the suggestion. On the other hand, if the new configuration is deemed likely not to improve the workload, process 4100 informs the user that load balancing has not been successful (step 4106). This message is generally displayed on console 6.

FIG. 22 illustrates a process 4500 for LAN workload balancing according to one embodiment of the present invention. At step 4501, the process simulates the workload. The simulation results used to determine whether or not the load balancing may be solved within a given file server (e.g., file server 1). If YES, the process proceeds to step 4503 (step 4502). If NO, it goes to step 4505.

At step 4503, the process displays a message on the screen of console 6 instructing the user to change client LAN setting. This is generally done is a GUI environment for user convenience. The LAN workload balancing is performed by changing the setting of client 8. For example, when a user wishes to move the workload of file system A1 which is associated with LAN I/F 11-1 (IP address 192.168.1.11) to LAN I/F 11-2 (IP address 10.13.1.1), the user of client 8 needs to execute the following command, assuming the client is in a UNIX environment:

umount/usr1 mount 10.13.1.1:/A1/usr1

At step 4504, the file system association is changed when the user confirms the LAN setting change at step 4503. For example, the content of IP address field 3405 is changed from 192.168.1.11 to 10.13.1.1, so that file system A1 is associated or mapped to LAN I/F 11-2.

At step 4505, since the LAN workload balancing cannot be done within the file server, process 4500 performs the processor workload balancing, which is similar to the process described in FIGS. 6-8.

The present invention has been described in terms of specific embodiments to describe the invention and enable those skilled in the art to practice the invention. The embodiments described above may be modified or altered without departing from the scope of the invention. For example, although certain embodiments above have been described with assumption that file I/O is 100% cache miss, it is possible that some of the file I/O requests can be done without accessing disks (cache hit). For such environment, load balancing operation that is similar to the above embodiment can be done by monitoring and considering cache hit ratio of the file I/Os.

Also, process 4000 has been described as being performed within a file server, but its analysis part may be performed by a device that is external to the file server, e.g., console 6. Similarly, certain analysis steps of processes 4100 and 4500 may be performed externally from the file server as well although actual volume or file system migration is performed by the file server. The scope of the invention should be interpreted using the scope of the appended claims.

What is claimed is:

1. A storage system coupled to a plurality of clients via a communication link, the storage system comprising:

a first file server including a first network interface and a second network interface, said first network interface being assigned a first group of Internet Protocol (IP) addresses and said second network interface being assigned a second group of IP addresses;

a second file server including a third network interface assigned a third group of IP addresses;

a plurality of disks providing a plurality of storage area;

a storage unit including a storage area of first type that is assigned to the first network interface, a storage area of second type that is assigned to the second network interface, the storage area of first type including a first group of file systems, the storage area of second type including a second group of file systems, each file system being associated with an IP address; and a memory comprising a program to balance a workload, the program comprising, code for determining whether or not a disk workload of a first group of disks of the plurality of disks is heavy;

code for balancing the disk workload by distributing work to other disks to reduce the heavy disk workload of the first group of disks if the disk workload is determined to be heavy; and code for balancing a processor workload of a processor of the first file server by distributing work to other processors if the processor workload is determined to be heavy in order to reduce the heavy processor workload of the processor;

wherein the code for balancing the processor workload includes:

code for detaching a first file system and first IP address which is associated with said first file system if it is determined that the workload of the processor of the first file server is heavy, the first file system being part of the first group of file systems; and code for attaching said first file system to the second file server, said first IP address being assigned to the third network interface, so that the first file system may be accessed via the second file server but not from the first file server.

2. The storage system of claim 1, wherein the code for balancing the disk workload includes code for determining whether or not an unused logical device exists in a second group of disks in the storage system;

code for migrating a logical device associated with the first group of disks to the second group of disks if the second group of disks is determined to have at least one unused logical device.

3. The storage system of claim 2, wherein the code for balancing the disk workload further includes:

code for determining the least busy group of disks from a plurality of groups of disks in the storage system, wherein the least busy group of disks is the second group of disks.

4. The storage system of claim 3, wherein the first and second groups of disks are first and second redundant arrays of inexpensive disks (RAID), respectively.

5. The storage system of claim 1, wherein the first group of disks is a redundant array of inexpensive disks (RAID).

6. The storage system of claim 1, wherein the storage area of first type includes first and second file systems which are associated with first and second IP addresses, respectively, and the storage area of second type includes third and fourth file systems, wherein the program further comprises:

code for determining whether or not a workload of the first network interface is heavy; and code for reassigning the first file system from the storage area of first type to the storage area of second type if the workload of the first network interface is determined to be heavy.

7. The storage system of claim 6, wherein the program further comprises:

code for determining whether or not reassigning the first file system from the storage area of first type to the storage area of second type would improve the workload of the first network interface without causing the second network interface to experience bottleneck.

8. The storage system of claim 7, wherein the code for balancing the processor workload is executed if it is determined that the second network interface would experience bottleneck if the reassignment of the first file system is carried out.

9. The storage system of claim 1, wherein the first group of disks is located in one of the file servers; and wherein the code for balancing the disk workload includes:

code for determining whether or not an unused logical device exists in a second group of disks in the same file server as the first group of disks; and code for migrating a logical device associated with the first group of disks to the second group of disks if the second group of disks is determined to have at least one unused logical device.

10. The storage system of claim 9, wherein the code for balancing the disk workload further includes:

code for determining the least busy group of disks from a plurality of groups of disks located in the same file server as the first group of disks, wherein the least busy group of disks is the second group of disks.

11. A storage system coupled to a plurality of clients via a communication link, the storage system comprising:

a first file server including a first network interface and a second network interface, said first network interface being assigned a first group of Internet Protocol (IP) addresses and said second network interface being assigned a second group of IP addresses;

a second file server including a third network interface assigned a third group of IP addresses;

a plurality of disks providing a plurality of storage areas;

a storage unit including a storage area of first type that is assigned to the first network interface, a storage area of second type that is assigned to the second network interface, the storage area of first type including a first group of file systems, the storage area of second type including a second group of file systems, each file system being associated with an IP address, wherein the storage area of first type includes first and second file systems which are associated with first and second IP addresses, respectively, and the storage area of second type includes third and fourth file systems; and disks is heavy, the first memory being provided within a console that is remotely located from the first and second file servers.

12. The storage system of claim 11, wherein the program further comprises:
code for balancing a processor workload of a processor of the first file server if the processor workload is determined to be heavy.

13. The storage system of claim 11, wherein the memory includes a first memory comprising the code for determining whether or not the disk workload of the first group of a first group of file systems, the storage area of second type including a second group of file systems, each file system being associated with an IP address,
wherein the method comprises:
determining whether or not the storage system is experiencing a performance degradation;
determining a cause of the performance degradation, wherein the determined cause can be a first cause, a second cause, or a third cause; and
applying an appropriate load balancing method according to the determined cause of the performance degradation,
wherein the appropriate load balancing method is a first balancing method if the determined cause is the first cause, a second balancing method of the determined cause is the second cause, and a third balancing method if the determined cause is the third cause; and
wherein the first balancing method involves balancing a disk workload by distributing work from a first group of disks to other disks to reduce a heavy disk workload of the first group of disks of the plurality of disks, and the second balancing method involves balancing a processor workload of a processor of the first file server by distributing work to other processors in order to reduce a heavy processor workload of the processor, and the third balancing method involves balancing a LAN workload;
wherein the second balancing method includes:
detaching a first file system and first IP address which is associated with said first file system if it is determined that the workload of the processor of the first file server is heavy, the first file system being part of the first group of file systems; and
attaching said first file system to the second file server, said first IP address being assigned to the third network interface, so that the first file system may be accessed via the second file server but not from the first file server.

14. The storage system of claim 13, wherein the memory includes a second memory comprising the code for balancing the disk workload if the disk workload is determined to be heavy, the second memory being provided within one of the first and second file servers.

15. A method for balancing workload of a storage system including first and second file servers and a storage unit, which includes a plurality of storage areas provided by a plurality of disks,
wherein the file servers include a first file server including a first network interface and a second network interface, said first network interface being assigned a first group of Internet Protocol (IP) addresses and said second network interface being assigned a second group of IP addresses, wherein the second file server includes a third network interface assigned a third group of IP addresses,
wherein the storage unit includes a storage area of first type that is assigned to the first network interface, a storage area of second type that is assigned to the second network interface, the storage area of first type including a memory system comprising a program to balance a workload, the program comprising,
code for determining whether or not a disk workload of a first group of disks of the plurality of disks is heavy;
code for balancing the disk workload by distributing work to other disks to reduce the heavy disk workload of the first group of disks if the disk workload is determined to be heavy;
code for determining whether or not a workload of a first network interface is heavy; and
code for reassigning the first file system from the storage area of first type to the storage area of second type if the workload of the first network interface is determined to be heavy.

16. The method of claim 15, wherein the first balancing method includes:
determining whether or not an unused logical device exists in a second group of disks in the storage system;
migrating a logical device associated with the first group of disks to the second group of disks if the second group of disks is determined to have at least one unused logical device.

17. The method of claim 16, wherein the first balancing method includes:
determining the least busiest group of disks from a plurality of groups of disks in the storage system, wherein the least busiest group of disks is the second group of disks.

18. The method of claim 15, wherein the determining steps are performed within one of the file servers or a management device coupled to the file servers, the management device being provided external to the file servers.

* * * * *